United States Patent [19]

Obitsu et al.

[11] Patent Number: 4,826,806
[45] Date of Patent: May 2, 1989

[54] FLUORAN COMPOUNDS AND COLOR FORMING RECORDING MATERIALS USING SAME

[75] Inventors: Takeo Obitsu, Omiya; Yutaka Ohnishi, Urawa; Shinji Yoshinaka, Iwatsuki; Minoru Koguchi, Ageo; Mitsuhiro Yanagita; Nobuyuki Hirai, both of Tokyo, all of Japan

[73] Assignee: Shin Nisso Kako Co., Ltd., Tokyo, Japan

[21] Appl. No.: 79,456

[22] Filed: Jul. 29, 1987

[30] Foreign Application Priority Data

| Jul. 31, 1986 | [JP] | Japan | 61-181224 |
| Oct. 27, 1986 | [JP] | Japan | 61-253650 |
| Nov. 7, 1986 | [JP] | Japan | 61-263889 |
| Dec. 8, 1986 | [JP] | Japan | 61-290379 |
| Dec. 19, 1986 | [JP] | Japan | 61-301421 |

[51] Int. Cl.$^4$ .................. B41M 5/16; B41M 5/18; B41M 5/22
[52] U.S. Cl. .................. 503/217; 427/151; 428/913; 428/914; 503/220; 503/221; 503/223
[58] Field of Search .................. 427/150-152; 503/216, 217, 221, 225, 210-212, 220, 223; 428/913, 914

[56] References Cited

U.S. PATENT DOCUMENTS 4,687,862  8/1987  Obitsu et al. .................. 503/221

FOREIGN PATENT DOCUMENTS

| 0067793 | 12/1982 | European Pat. Off. | 503/225 |
| 0124377 | 11/1984 | European Pat. Off. | 503/220 |
| 0138177 | 4/1985 | European Pat. Off. | 503/221 |
| 2262127 | 7/1973 | Fed. Rep. of Germany | 549/224 |
| 0226871 | 11/1985 | Japan | 503/220 |
| 2042877 | 2/1987 | Japan | 503/221 |

*Primary Examiner*—Bruce H. Hess
*Attorney, Agent, or Firm*—Michael N. Meller

[57] ABSTRACT

Fluoran compounds are disclosed of formula (I)

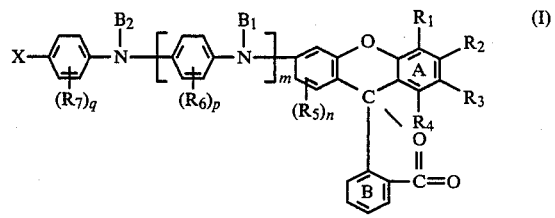

wherein $R_1$, $R_2$, $R_3$ and $R_4$ independently represent hydrogen, halogen, lower alkoxy, $C_1$-$C_9$-alkyl, $C_5$ or $C_6$-cycloalkyl, benzyl or phenyl, said benzyl or phenyl being optionally substituted by halogen, lower alkyl or lower alkoxy, and further $R_1$ and $R_2$ as well as $R_3$ and $R_4$ taken together with Ring A, may form a naphthalene ring optionally substituted by halogen, lower alkyl or lower alkoxy, $R_5$, $R_6$ and $R_7$ independently represent halogen, lower alkyl or lower alkoxy, $B_1$ and $B_2$ independently represent hydrogen, $C_1$-$C_8$-alkyl, benzyl or phenyl, said benzyl or phenyl being optionally substituted by halogen, lower alkyl, lower alkoxy, or alkyl-substituted amino, X represents hydrogen atom or —$NR_8R_9$ wherein $R_8$ and $R_9$ independently represent hydrogen, $C_1$-$C_8$-alkyl, $C_5$ or $C_6$-cycloalkyl, or benzyl, said benzyl being optionally substituted by halogen, lower alkyl, lower alkoxy, or alkyl-substituted amino, and further $R_8$ and $R_9$ taken together with the adjacent nitrogen atom to which they are attached, may form a pyrrolidino, piperidino or morpholino ring, Ring B being optionally substituted by halogen, n, p and q independently represent 0, 1 or 2, and m represents 0, 1, 2 or 3, provided that when m is 0 or 1, X is not hydrogen atom. The compounds are used, together with a developer, in color forming recording materials such as pressure-sensitive copying papers, heat-sensitive recording papers and the like.

10 Claims, 7 Drawing Sheets

FLUORAN COMPOUNDS AND COLOR FORMING RECORDING MATERIALS USING SAME

FIELD OF THE INVENTION

This invention relates to new fluoran compounds, of which the colors formed by the action of developers are blackish colors and have absorption of electromagnetic waves also in the near-infrared region, and to color forming recording materials using same.

BACKGROUND OF THE INVENTION

There have been made various proposals on chromogenic dyes which are colorless in themselves but form dyes absorbing electromagnetic waves ranging from the long wavelength region of visible light to the near-infrared region on contact with acidic subsances. Among others, phthalide type compounds are known as the compounds having such properties as mentioned above, from Japanese Patent L-O-P Publication Nos. 121035/1976, 121037/1976, 121038/1976, 115448/1980, 115449/1980, 115450/1980, 115451/1980, 115452/ 1980, 115456/1980, 167979/1982, 157779/1983, 8364/1985 and 27589/1985. Thiofluoran type compounds are also known from Japanese Patent L-O-P Publication No. 148695/1984, and fluorene type compounds are known from Japanese Patent L-O-P Publication No. 199757/1984 and European Patent Laid-Open-to-Public Publication No. 124377. Furthermore, fluoran compounds have been proposed in Japanese Patent L-O-P Publn. No. 284485/1986.

Most of these chromogenic dyes as proposed above, however, form gray-bluish or gray-greenish colors, and such chromogenic dyes as forming blackish colors and having absorption of electromagnetic waves also in the near-infrared region are not known as yet.

Recently, bar codes have come to be extensively used as a means for controlling distribution of commodities.

In reading markings of the bar codes, there is an increasing tendency that because of their cheapness, reading equipments relying on the use of semiconductor laser have been often used. The semiconductor laser emits visible light rays and near-infrared rays of the wavelength of 650 nm or more, and hence the markings which are read out by such equipments should be those which absorb visible light rays to near-infrared rays of the above-mentioned wavelength range. At the same time, in order to confirm that color development has been perfectly effected, it is desirable that in the case of in store marking, the developed color is of blackish hue which can be most clearly confirmed.

Heretofore, numerous fluoran compounds which produce black color have been known, but all the colors produced thereby do not have absorption capacity in the near-infrared wavelength region.

Under such circumstances, there is a pressing need for chromogenic dyes which produce blackish colors and absorb electromagnetic waves not only in the visible light regions but also in the near-infrared regions upon contact with the developers.

SUMMARY OF THE INVENTION

A principal object of the invention is to provide new chromogenic dyes which form blackish colors by the action of developers, the colors formed thereby having absorption of electromagnetic waves also in the near-infrared regions.

Another object of the invention is to provide color forming recording materials using the above-mentioned new dyes, for example, pressure-sensitive copying papers, heat-sensitive recording papers and the like.

Other objects of the invention will be obvious from the contents of the specification hereinafter disclosed.

DETAILED DESCRIPTION OF THE INVENTION

Figure 1:
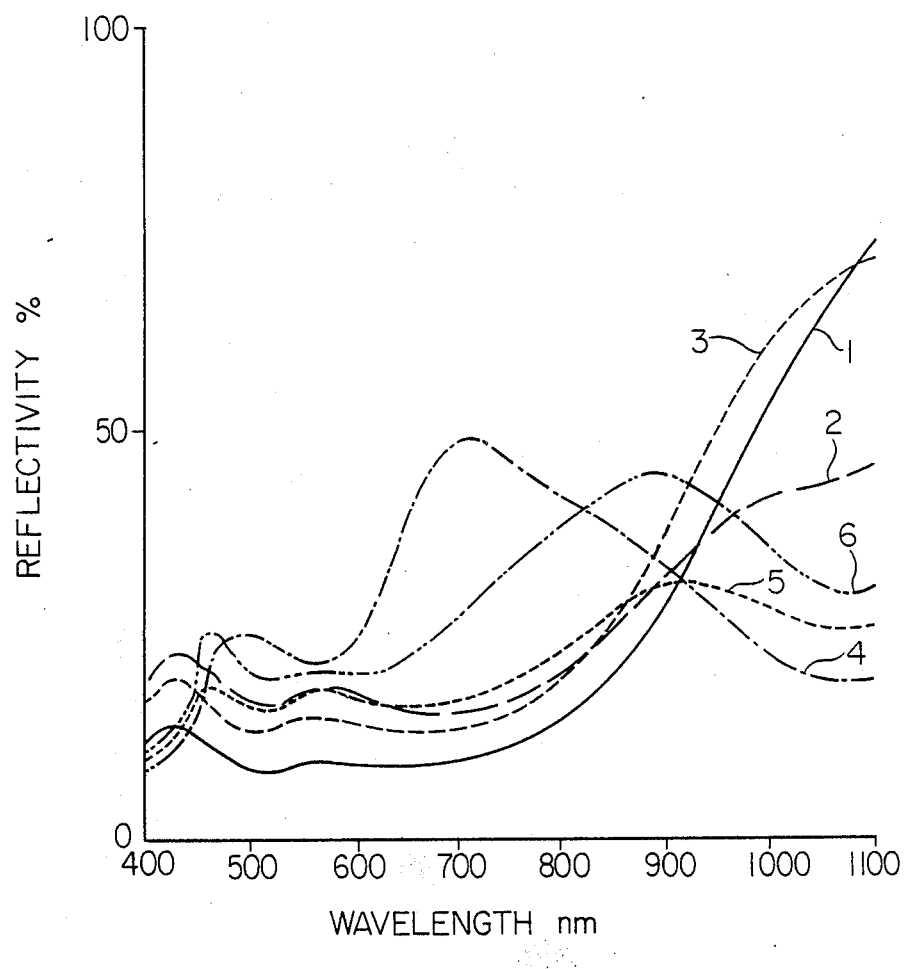
FIG. 1 shows reflection curves of colors formed with various acidic substances used in Example 6, wherein curve 1 was obtained with zinc thiolbenzoate, curve 2 with 2-bromobenzoic acid, curve 3 with pentamethylene-bis-p-hydroxybenzoate, curve 4 with tribromomethylphenyl sulfone, curve 5 with a clay-coated bottom sheet, and curve 6 with a resin-coated bottom sheet.

The objects of the invention are accomplished by providing as chromogenic dyes new fluoran compounds of formula (I)

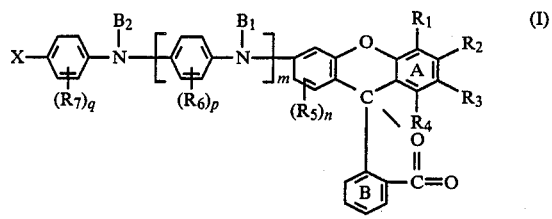

wherein $R_1$, $R_2$, $R_3$ and $R_4$ may be the same or different and each represents hydrogen, halogen, lower alkoxy, alkyl of 1 to 9 carbons, cycloalkyl of 5 or 6 carbons, benzyl or phenyl, said benzyl or phenyl being optionally substituted by halogen, lower alkyl or lower alkoxy, and further $R_1$ and $R_2$ as well as $R_3$ and $R_4$ taken together with Ring A, may form a naphthalene ring, said naphthalene ring being optionally substituted by halogen, lower alkyl or lower alkoxy; $R_5$, $R_6$ and $R_7$ may be the same or different and each represents halogen, lower alkyl or lower alkoxy; $B_1$ and $B_2$ may be the same or different and each represents hydrogen, alkyl of 1 to 8 carbons, benzyl or phenyl, said benzyl or phenyl being optionally substituted by halogen, lower alkyl, lower alkoxy, or alkyl-substituted amino; X represents hydrogen or $-NR_8R_9$ wherein $R_8$ and $R_9$ may be the same or different and each represents hydrogen, alkyl of 1 to 8 carbons, cycloalkyl of 5 or 6 carbons or benzyl, said benzyl being optionally substituted by halogen; lower alkyl, lower alkoxy, or alkyl-substituted amino, and further $R_8$ and $R_9$ taken together with the adjacent nitrogen atom to which they are attached, may form a pyrrolidino, piperidino or morpholino rings, Ring B being optionally substituted by halogen, n, p and q independently represent 0, 1 or 2; and m represents 0, 1, 2, or 3, provided that when m is 0 or 1, X is not hydrogen atom.

The fluoran compounds of formula (I) are characterized by forming blackish colors by the action of developers, said formed colors absorbing electromagnetic waves ranging from the visible light region to near-infrared region.

The term "blackish colors" as used in the invention means black and colors close to black which include reddish black, greenish black, bluish black, purplish black, dark blue, dark green and dark purple.

Typical examples of the fluoran compounds of formula (I), by way of illustration but not of limitation, include those indicated below.

The fluoran compounds of general formula (I) in which X is hydrogen atom include
3-[4'-(4''-phenylaminophenylamino)phenylamino]-6-methyl-7-chlorofluoran,
3-[4'-(4''-phenylaminophenylamino)phenylamino]-7-methylfluoran,
3-[4'-(4''-phenylaminophenylamino)phenylamino]-6-benzylfluoran,
3-[4'-(4''-phenylaminophenylamino)phenylamino]-7-cyclohexylfluoran,
3-[4'-(4''-phenylaminophenylamino)phenylamino]-7-chlorofluoran,
3-[4'-(4''-phenylaminophenylamino)phenylamino]-6-chlorofluoran,
3-[4'-(4''-phenylaminophenylamino)phenylamino]-5,7-dichlorofluoran,
3-[4'-(4''-phenylaminophenylamino)phenylamino]-7-sec-octylfluoran,
3-[4'-(4''-phenylaminophenylamino)phenylamino]-7-phenylfluoran,
3-[4'-(4''-phenylaminophenylamino)phenylamino]-6,7-dimethylfluoran,
3-[4'-(4''-phenylaminophenylamino)phenylamino]-5,7-dimethylfluoran,
3-[4'-(4''-phenylaminophenylamino)phenylamino]-5,6-benzofluoran,
3-[4'-(4''-phenylaminophenylamino)phenylamino]-7,8-benzofluoron,
3-[4'-(4''-(3''-methylphenylamino)phenylamino)phenylamino]-6-methyl-7-chlorofluoran,
3-[4'-(4''-phenylaminophenylamino)-2'-methylphenylamino]-6-methyl-7-chlorofluoran, and
3-[4'-(4''-phenylaminophenylamino)phenylamino]-7-methoxyfluoran.

The fluoran compounds of formula (I) in which X is $-NR_8R_9$ include
3-[4'-(4''-dimethylaminophenylamino)phenylamino]-7-methylfluoran,
3-[4'-(4''-pyrrolidinophenylamino)phenylamino]-6-methyl-7-chlorofluoran,
3-[4'-(4''-diethylaminophenylamino)phenylamino]-5,6-benzfluoran,
3-[4'-(4''-N-butyl-N-methylaminophenylamino)phenylamino]-5,6-dichlorofluoran,
3-[N-(4'-(4''-morpholinophenylamino)phenyl)-N-benzyl]amino-6,7-dimethylfluoran,
3-[4'-(4''-N-hexyl-N-methylaminophenylamino)phenylamino]-7-chlorofluoran,
3-[4'-(4''-dibenzylaminophenylamino)phenylamino]-7-butylfluoran,
3-[4'-(4''-dimethylaminophenylamino)-2',3'-dimethylphenylamino]-7-phenylfluoran,
3-[4'-(N-(4''-dimethylaminophenyl)-N-benzyl)aminophenylamino]-2-chloro-7-octylfluoran,
3-[N-(4'-(4''-dimethylamino-3''-methylphenylamino)-phenyl)-N-(4'-dimethylaminophenyl)]aminofluoran,
3-[4'-(4''-dimethylamino-2'',5''-dimethylphenylamino)-phenylamino]-6-methyl-7-chlorofluoran,
3-[4'-(4''-dimethylaminophenylamino)phenylamino]-5,7-dimethylfluoran,
3-[4'- 4''-dimethylaminophenylamino)phenylamino]-6-methyl-7-chlorofluoran,
3-[4'-(4''-(4'''-dimethylaminophenylamino)phenylamino)phenylamino]-6-methyl-7-chlorofluoran,
3-[4'-(4''-(4'''-dimethylaminophenylamino)phenylamino)phenylamino]-6,7-dimethylfluoran,
3-(4'-dimethylaminophenylamino)-6-chlorofluoran,
3-(4'-dimethylaminophenylamino)-6-methylfluoran,
3-(4'-dimethylaminophenylamino)-7-methylfluoran,
3-(4'-dimethylaminophenylamino)-6-methyl-7-chlorofluoran,
3-(4'-dimethylaminophenylamino)-7-nonylfluoran,
3-(4'-dimethylaminophenylamino)-6,7-dimethylfluoran,
3-(4'-dimethylaminophenylamino)-7-phenylfluoran,
3-(4'-diethylaminophenylamino)-6-chlorofluoran,
3-(4'-diethylaminophenylamino)-5,7-dichlorofluoran,
3-(4'-diethylaminophenylamino)-6-methylfluoran,
3-(4'-diethylaminophenylamino)-7-methylfluoran, 3-(4'-diethylaminophenylamino)-6-methyl-7-chlorofluoran,
3-(4'-diethylaminophenylamino)-7-nonylfluoran,
3-(4'-dibutylaminophenylamino)-6-chlorofluoran,
3-(4'-dibutylaminophenylamino)-6-methylfluoran,
3-(4'-dibutylaminophenylamino)-7-methylfluoran,
3-(4'-dibutylaminophenylamino)-6,7-dimethylfluoran,
3-(4'-dibutylaminophenylamino)-6-methyl-7-chlorofluoran,
3-(4'-dibutylaminophenylamino)-7-octylfluoran,
3-(4'-dibutylaminophenylamino)-7-phenylfluoran,
3-[4'-(N-propyl-N-methylamino)pheylamino]-6-chlorofluoran,
3-[4'-(N-propyl-N-methylamino)phenylamino]-7-methylfluoran,
3-[4 -(N-propyl-N-methylamino)phenylamino]-6-methyl-7-chlorofluoran,
3-4'-(N-butyl-N-ethylamino)phenylamino]-6- methyl-7-chlorofluoran,
3-(4'-dioctylaminophenylamino)-6-methyl-7-chlorofluoran,
3-[4'-(N-cyclohexyl-N-methylamino)phenylamino]-6-methyl-7-chlorofluoran,
3-4'-(N-cyclohexyl-N-methylamino)phenylamino]-7-octylfluoran,
3-(4'-benzylaminophenylamino)-6-methyl-7-chlorofluoran,
3-(4'-pyrrolidinophenylamino)-6-chlorofluoran,
3-(4'-pyrrolidinophenylamino)-7-methylfluoran,
3-(4'-pyrrolidinophenylamino)-6-methyl-7-chlorofluoran,
3-(4'-piperidinophenylamino)-6-methylfluoran,
3-(4'-piperidinophenylamino)-7-methylfluoran,
3-(4'-piperidinophenylamino)-6-methyl-7-chlorofluoran,
3-(4'-piperidinophenylamino)-7-octylfluoran, 3-(4'-morpholinophenylamino)-6-chlorofluoran,
3-(4'-morpholinophenylamino)-7-phenylfluoran,
3-(4'-dimethylaminophenylamino)-5,6-benzofluoran,
3-(4'-dimethylaminophenylamino)-7,8-benzofluoran, and
3-bromo-8-dimethylaminophenylaminobenz[a]fluoran.

The fluoran compounds of formula (I) can be prepared by reacting 1 mole of a meta-aminophenol derivative of formula (II)

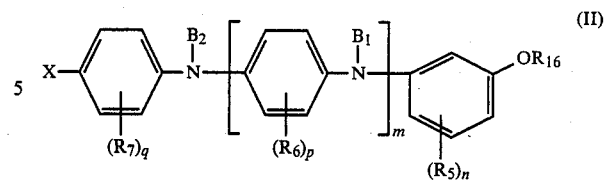

wherein $R_5$, $R_6$, $R_7$, $B_1$, $B_2$, X, m, n, p and q are the same as defined previously, and $R_{16}$ represents hydrogen, lower alkyl or acyl, with about 1 mole of a benzoic acid derivative of formula (III)

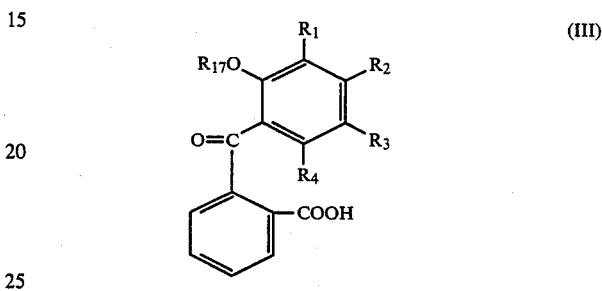

wherein $R_1$, $R_2$, $R_3$ and $R_4$ are the same as defined previously, and $R_{17}$ represents hydrogen or lower alkyl. This reaction may be effected in accordance with the usual method for the preparation of conventional fluoran compounds and, for example, it is carried out in sulfuric acid at a temperature of 0°–50° C. for a time ranging from several hours to several decades of hours.

The meta-aminophenol derivatives of formula (II) are new and can be prepared by condensation reaction according to the reaction formula

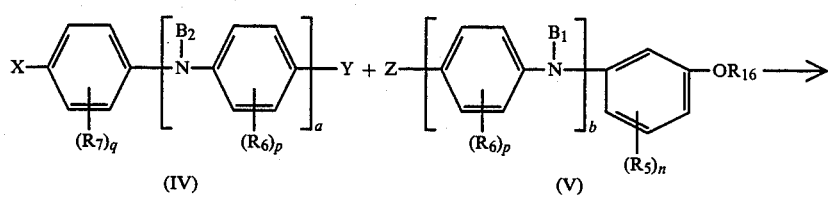

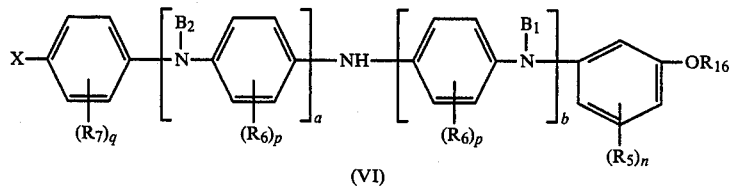

wherein $R_5$, $R_6$, $R_7$, $R_{16}$, $B_1$, $B_2$, n, p, q and X are the same as defined previously, Y and Z each represents —NH$_2$ or —OH, provided that one of Y and Z is —NH$_2$, and the other is —OH, a and b each represent 0, 1 or 2, and a+b is m in formula (II). In the compounds of formula (VI), the group —NH— may be, if necessary, alkylated, benzylated or phenylated according to the known method.

The condensation reaction mentioned above may be effected by heating the compounds of formulas (IV) and (V), together with titanium alcoholate, in an inert organic solvent heating these two compounds in the titanium alcoholate used in itself as a solvent, or heating said two compounds, together with Lewis acid (e.g.

anhydrous zinc chloride or titanium tetrachloride) or phosphoric acid, in the presence or absence of an inert solvent. Where a and b each represent 1 or 2 in formula (IV) and (V), the procedure using titanium alcoholate is preferably used from the standpoint of reaction yield as well as purity of the meta-aminophenol derivatives obtained.

The fluoran compounds of formula (I) can be used in color forming recording materials according to the same way as in the case of known fluoran compounds. Color forming recording materials can include heat-sensitive recording sheet, pressure-sensitive copying sheet, and those for heat-sensitive transfer recording, electro thermo-recording, electrophotography using toners containing acidic substances as developers, ultrasonic recording, photosensitive recording, electron recording, stamping materials, stamp ink, typewriter ribbons or the like.

In that case, the fluoran compounds of formula (I) can of course be used, either singly or in combination therewith.

The fluoran compounds of the invention can be used in combination with other chromogenic dyes forming colors which absorb electromagnetic waves ranging from the visible light region to near-infrared region, for example, the aforementioned phthalide, thiofluoran and fluorene type compounds, said fluorene compounds including particularly those represented by the formula

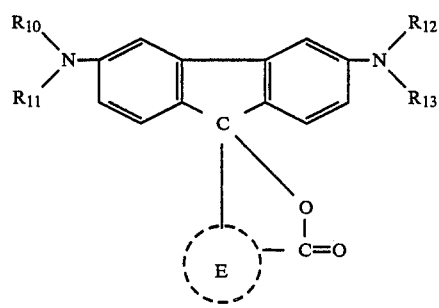

wherein ring E is

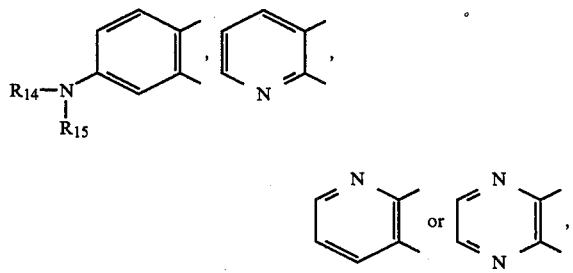

$R_{10}$, $R_{11}$, $R_{12}$, $R_{13}$, $R_{14}$ and $R_{15}$ independently are hydrogen, alkyl of 1 to 12 carbons, cycloalkyl which may be substituted by one or more lower alkyl, phenyl or benzyl, $R_{10}$ and $R_{11}$, $R_{12}$ and $R_{13}$, or/and $R_{14}$ and $R_{15}$ taken together with the nitrogen atom to which they are attached, may form a 5- or 6-membered heterocyclic ring (e.g. 3,6-bis(dimethylamino)- fluorene-9-spiro-3'-(6'-dimethylamino)phthalide). Further, the fluoran compounds of the invention can be used in combination with other chromogenic dyes which form colors not absorbing electromagnetic waves in the near-infrared region by the action of a developer, for example, blue color formers such as crystal violet lactone, benzoyl leucomethylene blue, and (5 or 7)-(1-octyl-2-methylindol-3-yl)-(5 or 7)-(4-diethylamino-2-ethoxyphenyl)-5,7-dihydrofuro(3,4-b)-pyridine-7(or 5)-one; green color formers such as 3-diethylamino-5-methyl-7-dibenzylaminofluoran and 3-N-isobutyl-ethylamino-7-phenylaminofluoran; red color formers such as 3-diethyl-yl-amino-6-methyl-7-chlorofluoran and 3-cyclohexylamino-6chlorofluoran; or black color formers such as 3-diethylamino-6-methyl-7-phenylaminofluoran, amino-6-methyl-7-phenylaminofluoran, 3-N-methyl-cyclohexylamino-6-methyl-7-phenylaminofluoran, 3-N-methyl-N-propylamino-6-methyl-7-phenylaminofluoran, 3-N-isopentyl-ethylamino-6-methyl-7-phenylaminofluoran, 3-diethylamino-7-m-trifluoromethylphenylaminofluoran, 3-di-n-butylamino-7-chlorophenylaminofluoran and 3-N-ethyltoluidino-6-methyl-7-phenylaminofluoran.

Developers which are used for color development of the fluoran compounds of formula (I) include, in addition to acidic substances conventionally used in color forming recording materials; organohalogen compounds which form halogen radical by the action of heat; and polyvalent metal salts of substituted or unsubstituted nitrobenzoic and nitrobenzenesulfonic acids.

Typical examples of these developers are shown below by way of illustration but not of limitation.

The acidic substances include inorganic acidic substances such as acid clay, activated clay, attapulgite, bentonite, colloidal silica, aluminum silicate, magnesium silicate, zinc silicate, tin silicate, calcined kaolin and talc; aliphatic carboxylic acids such as oxalic acid, maleic acid, tartaric acid, citric acid, succinic acid and stearic acid; aromatic carboxylic acids such as benzoic acid, p-tert-butylbenzoic acid, thiolbenzoic acid, 2-bromobenzoic acid, p-cyanobenzoic acid, 2,4-dichlorobenzoic acid, phthalic acid, gallic acid, salicylic acid, 3-isopropylsalicylic acid, 3-phenylsalicylic acid, 3-cyclohexyl salicylic acid, 3,5-di-tert-butylsalicylic acid, 3-methyl-5-benzylsalicylic acid, 3-phenyl-5-(2,2-dimethylbenzyl)salicylic acid, 3,5-di-(2-methylbenzyl)-salicylic acid and 2-hydroxy-1-benzyl-3-naphthoic acid; salts of these aromatic carboxylic acids with such metals as zinc, magnesium, aluminum, tin, titanium and the like; phenol resin type developers such as p-phenylphenol-formalin resins and p-butylphenol-acetylene resins; mixtures of these phenol resin type developers and the above-mentioned metal salts of aromatic carboxylic acids; bisphenol compounds such as bisphenol A, 4,4'-secondary-butylidenebisphenol, 4,4'-cyclohexylidenebisphenol, 2,2'-dihydroxydiphenyl and pentamethylene-bis(4-hydroxybenzoate); sulfur containing bisphenol compounds such as 1,7-di(4-hydroxyphenylthio)3,5-dioxaheptane; 4-hydroxybenzoic acid esters such as benzyl 4-hydroxybenzoate, ethyl 4-hydroxybenzoate, propyl 4-hydroxybenzoate, isopropyl 4-hydroxybenzoate, butyl 4-hydroxybenzoate, isobutyl 4-hydroxybenzoate, chlorobenzyl 4-hydroxybenzoate, methylbenzyl 4-hydroxybenzoate and diphenylmethyl 4-hydroxybenzoate; hydroxy sulfones such as 4-hydroxy-4'-methyldiphenylsulfone, 3,4-dihydroxy-4'-methyldiphenylsulfone, 4-hydroxy-4'-isopropoxydiphenylsulfone and 4-hydroxy-4'-butoxydiphenylsulfone; 4-hydroxyphthalic acid diesters such as dimethyl 4-hydroxyphthalate, dicyclohexyl 4-hydroxyphthalate and diphenyl 4-hydroxyphthalate; esters of hydroxynaphthoic acid such as 2-hydroxy-6-carboxynaphthalene; and further hydroxyacetophenone, p-phenylphenol, benzyl 4-hydroxyphenylacetate, p-benzylphenol, hydroquinone-mono-benzyl ether or the like.

Generally, the organohalogen compounds used as developers may be any substances so long as they form halogen radical, but preferable are organohalogen compounds represented by the formula

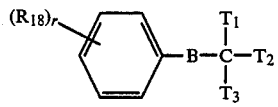

wherein $R_{18}$ represents halogen atom, nitro or lower alkyl, r represents 0 or an integer of 1 to 5, when r is 2 or more, $R_{18}$ may be different substituents, B represents

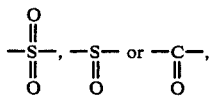

and $T_1$, $T_2$ and $T_3$ each represent hydrogen atom, chlorine atom or bromine atom, provided that all $T_1$, $T_2$ and $T_3$ are not hydrogen atoms simultaneously.

Typical examples of the above-mentioned organohalogen compounds include tribromomethylphenyl sulfone, trichloromethylphenyl sulfone, tribromomethyl-p-chlorophenyl sulfone, trichloromethyl-p-chlorophenyl sulfone, tribromo- methyl-p-nitrophenyl sulfone, tribromomethyl-o-methylphenyl sulfone, tribromomethyl-o-isopropylphenyl sulfone, $\alpha,\alpha,\alpha$-tribromoacetophenone, $\alpha,\alpha,\alpha$-trichloroacetophenone, p-nitro-$\alpha,\alpha,\alpha$-tribromoacetophenone, p-chloro-$\alpha,\alpha,\alpha$-tribromoacetophenone, tribromomethylphenyl sulfoxide, trichloromethylphenyl sulfoxide and the like.

These organohalogen compounds are disclosed as developers for use in photosensitive recording in Japanese Patent Publn. No. 1895/1972, Japanese Patent L-O-P Publn. Nos. 137126/1975, 212434/1982 and 132229/1983, and further described in Japanese Patent L-O-P Publn. No. 3791/1986 as an example of developers for use in heat-sensitive recording. However, it is not known as yet that different from acidic substances conventionally used as developers, these organohalogen compounds possess specific function and effect to enhance absorption of electromagnetic waves in the near-infrared region.

It is already known in the art that the organohalogen compounds used in the present invention form halogen radicals by the action of heat. In the present invention, it is considered that the fluoran compounds of formula (I) develop colors by a synergistic effect of the halogen radical and an acidic substance formed by the reaction of a part of halogen radical with a hydrogen donor (e.g. binder, moisture). Accordingly, the proportion of the above-mentioned organohalogen compound to the fluoran compound of formula (I) used should not be decided indiscriminately but should be decided after taking into consideration the amount of the halogen radicals formed by heating.

Polyvalent metal salts of substituted or unsubstituted nitrobenzoic and nitrobenzenesulfonic acids include the salts of nitrobenzoic and nitrobenzenesulfonic acids which are substituted by halogen, lower alkyl, aryl, aralkyl or nitro. More particularly, the polyvalent metal salts mentioned above are those of nitrobenzoic acids such as o-, m- or p-nitrobenzoic acid, 2-chloro-4-nitrobenzoic acid, 2-chloro-5-nitrobenzoic acid, 4-chloro-3-nitrobenzoic acid and 4-chloro-2-nitrobenzoic acid, and nitrobenzenesulfonic acids such as o-, m- or p-nitrobenzenesulfonic acid and 2-methyl-5-nitrobenzenesulfonic acid. These polyvalent metal salts may be any salts of polyvalent metals, but preferable are salts of zinc or tin.

Figure 5:
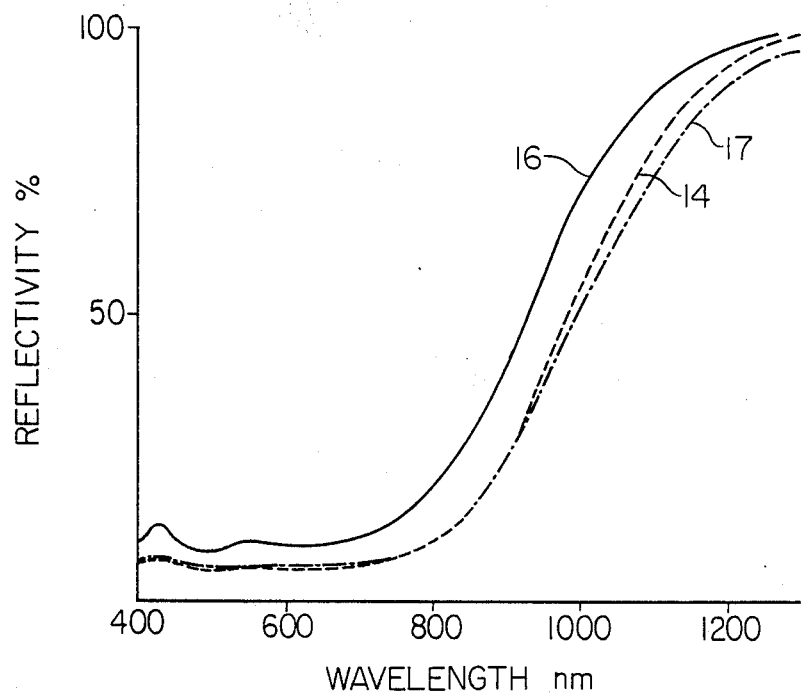
FIG. 5 shows reflection curves of color developed portions by heating of heat-sensitive recording papers prepared in Example 11 by varying amounts of developers used, wherein curve 14 was obtained with heat-sensitive recording paper (12), curve 16 with heat-sensitive recording paper (14), and curve 17 with heat-sensitive recording paper (15).

The proportion of the polyvalent metal salt of substituted or unsubstituted nitrobenzoic and nitrobenzenesulfonic acids to the fluoran compound of formula (I) used is preferably 1 part by weight of said fluoran compound based on 1-5 parts by weight of said polyvalent metal salt. This has been proved by demonstration as can be seen from Example 11 wherein heat-sensitive recording papers were prepared by using 1, 2 and 3 parts by weight of zinc 4-nitrobenzoate, respectively, based on 1 part by weight of the fluoran compound of formula (I), whereby sufficient colors were obtained in each case as evidenced by the reflection curves of the developed colors obtained as shown in FIG. 5 and the reflectivities obtained as shown in Table 4.

As mentioned above, the developers used in the present invention may classified into three groups, i.e. acidic substances, organohalogen compounds forming halogen radicals by the action of heat, and polyvalent metal salts of substituted or unsubstituted nitrobenzoic and nitrobenzenesulfonic acids, and they may be used singly or in combination thereof, for example, a combination use of the acidic substance and organohalogen compound.

The method for the production of a heat-sensitive recording paper using the fluoran compounds of formula (I) is similar to that of known chromogenic dyes. The heat-sensitive recording papers can be prepared in accordance with procedures disclosed, for examples, in Japanese Patent Publn. Nos. 27579/1964, 4160/1968 and 14039/1970, or Japanese Patent L-O-P Publn. No. 7087/1984.

That is, heat-sensitive recording papers excellent in color developability are prepared by coating papers with a dispersion prepared, for example, by dispersing fine particles of the fluoran compound of formula (I) or mixture thereof with other chromogenic dyes and fine particles of the developer in an aqueous solution of a water-soluble binder. Where a sensitizer has been added to the abovementioned dispersion, heat-sensitive recording papers having very high sensitivity can be obtained. This dispersion may further contain fillers, dispersing agents, colored image stabilizers, antioxidants, desensitizers, anti-tack agents, defoaming agents, light stabilizers, optical brighteners and the like.

The water-soluble binders include, by way of illustration but not of limitation, for example, polyvinyl alcohol, hydroxyethyl cellulose, carboxymethyl cellulose, salts of styrene-maleic anhydride copolymers, styrene-butadiene emulsions, vinyl acetate-maleic anhydride emulsions, vinyl acetate-maleic anhydride emulsions, polyacrylates, polyacrylamide, starches, casein and gum arabic.

The sensitizers include, for example, higher fatty acid amides, benzamide, stearic acid anilide, acetoacetic acid anilide, thioacetoanilide, dimethyl phthalate, dibenzyl terephthalate, dibenzyl isophthalate, diethers of bisphenol S such as 4,4'-dimethoxydiphenylsulfone, 4-isopropoxy-4'-n-butoxysulfone, 4,4'-dibutoxydiphenylsulfone, 4,4'-di-n(or iso-)pentyloxydiphenylsulfone and the like; diphenylamine, carbazole, 2,3-di-m-tolylbutane, 4,4'-dimethylbiphenyl, di-β-naphthyl-phenylenediamine, 2-mercaptobenzthiazole and the like.

The fillers include, for example, clay, talc, kaolin, satin white, titanium oxide, calcium carbonate, magnesium carbonate, barium sulfate, magnesium silicate and aluminum silicate, etc.

The dispersing agents include, for example, sulfosuccinic acid esters such as dioctyl sodium sulfosuccinate; sodium dodecylbenzenesulfonate; sodium lauryl sulfonate; and salts of fatty acid. The colored image stabilizers include, for example, salicylic acid derivatives, metal salts (particularly zinc salt) of oxynaphthonic acid derivatives and other water-insoluble zinc compounds. The antioxidants include, for example, 2,2'-methylenebis(4-methyl-6-tert-buthylphenol), 2,2'-methylenebis(4-ethyl-6-tert-butylphenol), 4,4'-propylmethylene-bis(3-methyl-6-tert-butylphenol) and 4,4'-thiobis(2-tert-butyl-5-methylphenol). The desensitizers include, for example, aliphatic higher alcohols, polyethylene glycol and guanidine derivatives. The anti-tack agents include, for example, stearic acid, zinc stearate, calcium stearate, carnauba wax, paraffin wax, etc.

The fluoran compounds of formula (I) can be used to prepare pressure-sensitive copying papers in accordance with such procedures as disclosed in U.S. Pat. Nos. 2,548,365, 2,548,366, 2,800,457 and 2,800,458, Japanese Pat. No. L-O-P Publn. No. 112041/1983 or 139738/1983.

The pressure-sensitive copying paper may be a unit comprising a top sheet wherein microcapsules encapsulating a solution of the color formers in an organic solvent are coated onto the lower surface, and a bottom sheet wherein a color developer (an acidic substance) is coated onto the upper surface (optionally, the unit may be provided with a middle sheet bearing the developer on the upper surface and microcapsules on the lower surface), or a self-contained paper wherein microcapsules and the developers are coated onto the same surface of the paper.

As the organic solvent can be used nonvolatile materials which dissolve the color formers and are inert thereto, for instance, diphenylmethanes, alkyl naphthalenes or alkyl triphenyls.

The fluoran compounds of formula (I) can be used for heat-transfer in accordance with such procedures as disclosed in Japanese Patent L-O-P Publns. Nos. 212985/1983, 33185/1984, 42995/1984 or 225986/1984, for electro thermosensitive recording in accordance with such procedures, for example, as disclosed in Japanese Patent L-O-P Publns. Nos. 96137/1973, 101935/1973 or 11344/1974, and for electrophotography in accordance with such procedures, for example, as disclosed in Japanese Patent L-O-P Nos. 24530/1977 or 56932/1977.

The fluoran compound of this invention can be used, furthermore, for photosensitive recording in accordance with such procedures, for example, as disclosed in Japanese Patent Publns. Nos. 24188 1963, 10550/1970 and 45978/1974, Japanese Patent L-O-P Publns. Nos. 80120/1975, 126228/1975, 141633/1977 or 147829/1979. In this case, usable as acid precursors forming protonic acid or Lewis acid by energy rays are organohalogen compounds, diazonium salts, iodonium salts, etc. disclosed, for example, in Japanese Patent L-O-P Publn. No. 13780/1977 and, in addition thereto, sulfonium salts such as dimethylphenacylsulfonium hexafluorophosphoric acid salt or triphenylsulfonium hexafluoroantimonic acid (V) salt.

The fluoran compounds of formula (I) can be used for ultrasonic wave recording in accordance with a procedure as disclosed in French Patent No. 2,120,922; for electrostatic recording in accordance with a procedure as disclosed in Japanese Patent Publn. No. 3932/1974; and for photosensitive printing materials in accordance with a procedure as disclosed in Japanese Patent L-O-P Publn. No. 12104/1973.

The recording papers prepared in accordance with the procedures mentioned above may be provided on the front surface with a protective layer and on the back surface with an adhesive layer for serving the convenience of their use as labels.

The recording materials prepared in accordance with the above procedures are used not only in the bar codes as mentioned previously but also in a wide variety of fields which include reproduction of books and documents and the like, electronic computers, facsimiles, ticket vending macines and labels, and moreover systems for high density information such as laser disks or preventing forgery and reproduction that cannot be seen with the naked eye, or unlocking apparatus, etc.

The color forming recording materials using the fluoran compounds of formula (I) have two striking features.

Figure 4:
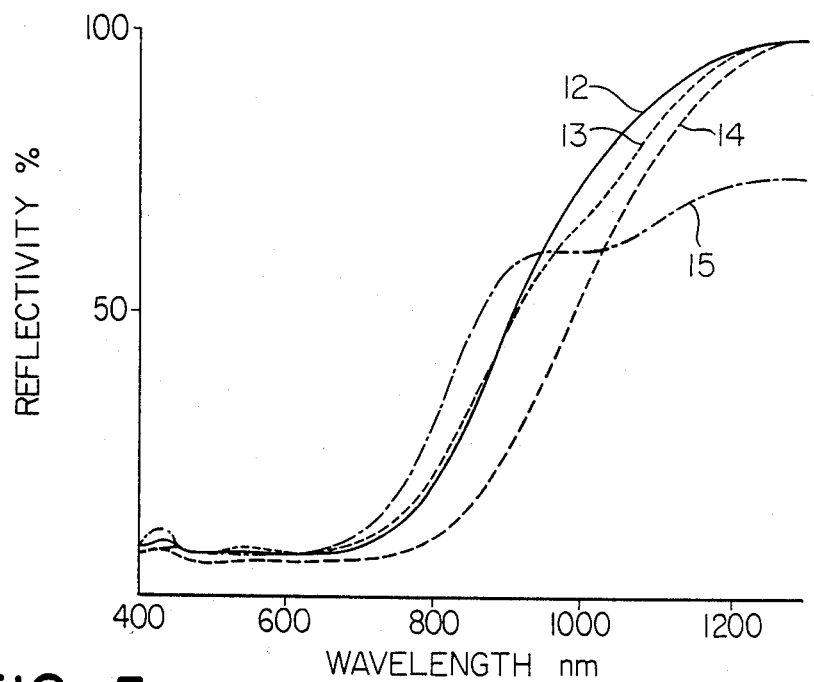
FIG. 4 shows reflection curves of color developed portions by heating of heat-sensitives recording papers prepared in Example 10 by using four kinds of developers, wherein curve 12 was obtained with heat-sensitive recording paper (10), curve 13 with heat-sensitive recording paper (11), curve 14 with heat-sensitive recording paper (12), and curve 15 with heat-sensitive recording paper (13).
Figure 6:
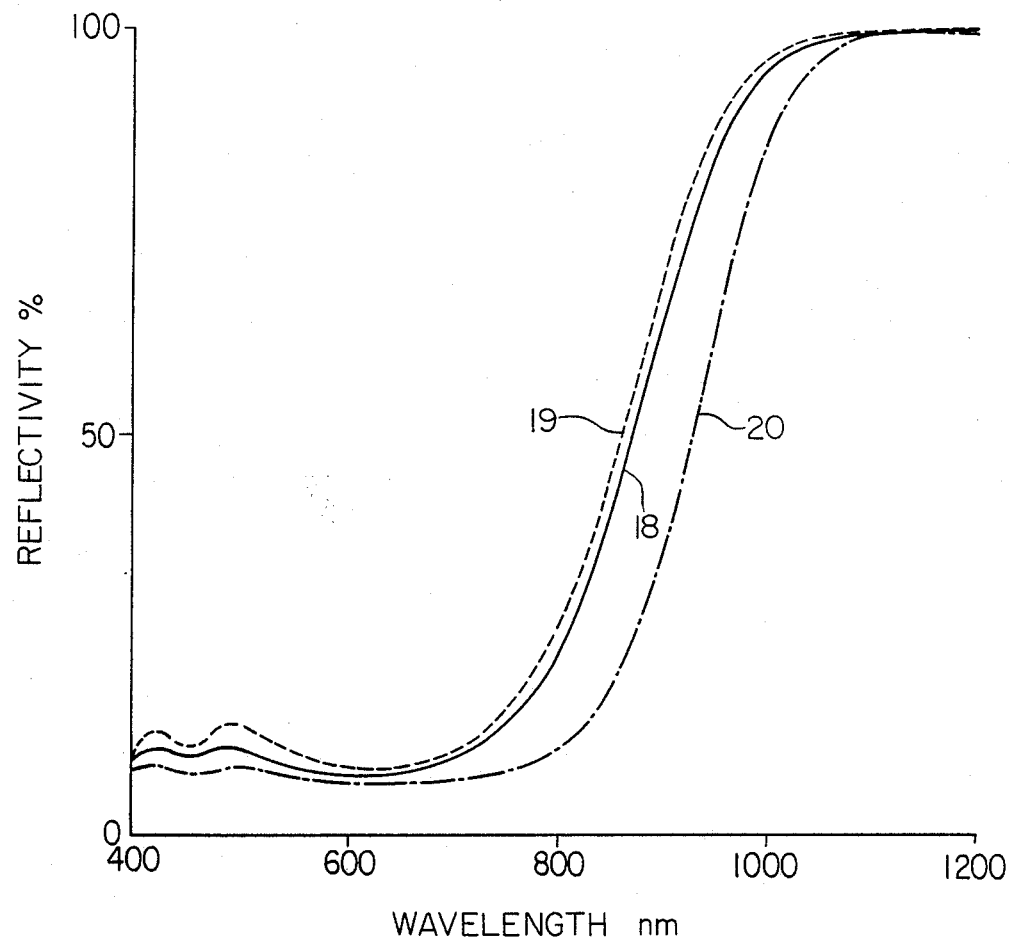
FIGS. 6 and 7 show reflection curves of color developed portions by heating of heat-sensitive recording papers prepared in Example 13 by using different developers, respectively, wherein curve 18 was obtained with heat-sensitive recording paper (17), curve 19 with heat-sensitive recording paper (18), curve 20 with heat-sensitive recording paper (19), curve 21 with heat-sensitive recording paper (20) and curve 22 with heat-sensitive paper (21).
Figure 7:
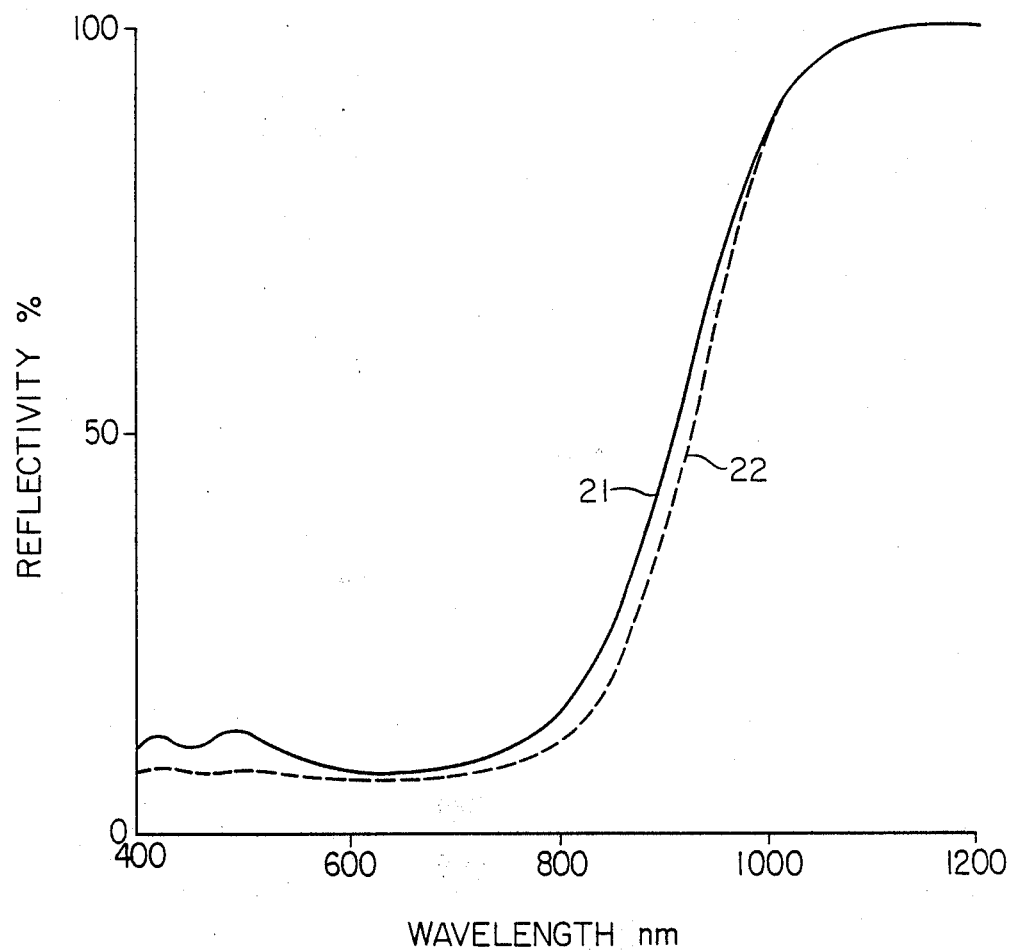

The first feature is that reflection curves of the developed colors of these fluoran compounds vary depending on the kind of developers used for developing said compounds. Reflection curves of colors developed by the use of three kinds of fluoran compounds of formula (I) in combination with developers varying in kind were shown in FIGS. 1, 4, 6 and 7. FIG. 1 shows reflection curves of colors obtained by the use in Example 6 of 3-[4'-(4''-phenylaminophenylamino)phenylamino]-6-methyl-7-chlorofluoran in combination with varying developers. FIG. 4 shows reflection curves of colors of heat-sensitive recording papers obtained by the use in Example 10 of 3-[4'-(4''-dimethylaminophenylamino)-phenylamino]-7-methylfluoran in combination with varying developers, and FIGS. 6 and 7 show reflection curves of colors obtained by the use in Example 13 of 3-(4'-dimethylaminophenylamino)-6-methyl-7-chlorofluoran in combination with varying developers.

As can be seen from FIGS. 1, 4, 6 and 7, the reflection curves vary markedly depending on the kinds of developers used, particularly in the near-infrared region.

In these figures, low reflectivities show that the developed colors strongly absorb the electromagnetic waves. Further, low reflectivities of electromagnetic waves over the whole wavelength of the visible region, i.e. high absorption, indicates that the developed colors are blackish colors when observed with the naked eye.

The second feature is that colors of the fluoran compounds of formula (I) developed by the action of developers become deeper during storage. This effect is particularly remarkable when the developed colors are illuminated with light. The compounds having such properties have been proposed in Japanese Patent L-O-P Publication No. 106964/1987, but the compounds of the present invention markedly differ from the proposed compounds in that the colors developed by the present compounds are blackish colors.

Figure 2:
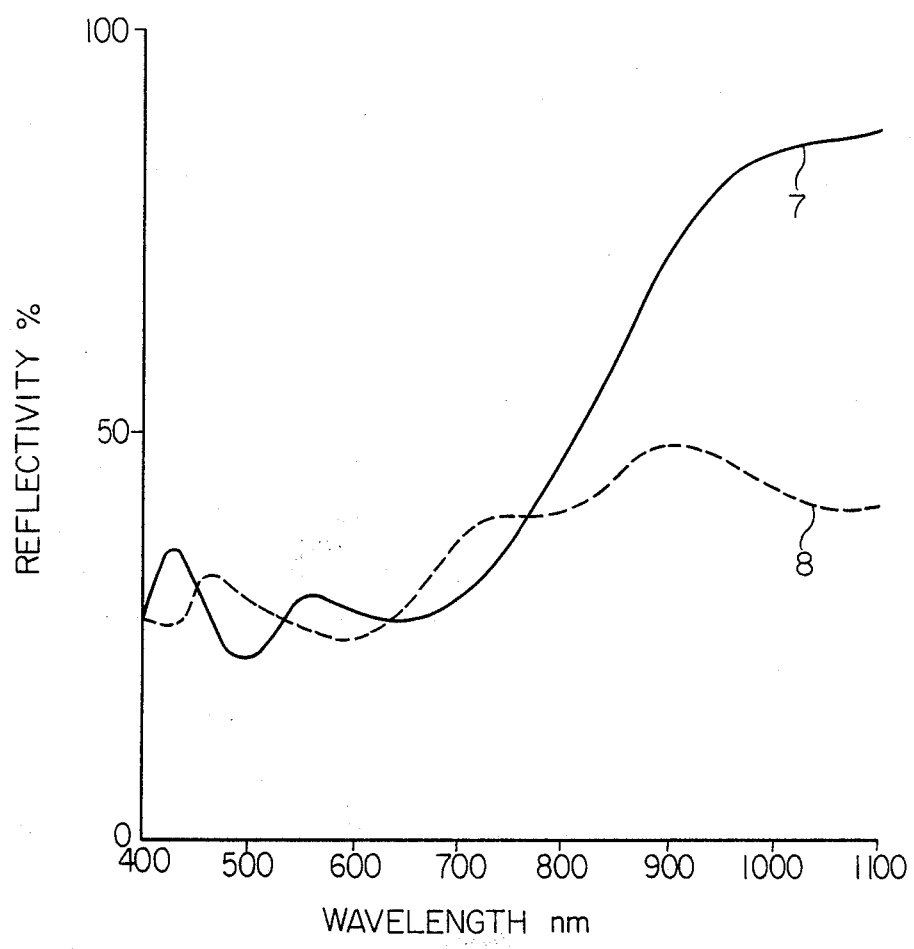
FIG. 2 shows reflection curves of colors formed on heat-sensitive recording paper (1) prepared in Example 7, wherein curve 7 was obtained before a light-fastness test, and curve 8.

Such features are demonstrated in FIG. 2 showing reflection curves of the color developed portions of heat-sensitive recording papers prepared in Example 7 before and after light-fastness test.

Since the fluoran compounds of the present invention have such properties as mentioned above, the density of the developed color of color forming recording materials using said compounds can be increased by irradiation with suitable light after color development. In this case, such light irradiation will bring about no staining of the color-undeveloped portion of the paper surface.

Although details of the mechanism of increase in the developed color density of the present fluoran compounds during storage and when irradiated with light have not been elucidated, it is considered that the dyes as developed undergo certain oxidation and the light accelerates said oxidation.

Then, an interesting method of using the present fluoran compounds is illustrated herein. European Patent Laid-Open-to-Public Publn. No. 124377 discloses fluorene compounds which develop colors by the action of acidic substances and the developed colors absorb electromagnetic waves ranging from the visible region to near-infrared region. However, the developed colors of these fluorene compounds are markedly poor in fastness to light.

In view of the foregoing, when the fluorene compounds mentioned above, for example, 3,6-bis(dimethyl- amino)fluorene-9-spiro-3'-(6'-dimethylamino)phthalide is used in combination with the present fluoran compounds, fading of one developed color by exposure to light can be compensated by the other which increases in density, and hence color forming recording materials prepared by using these two compounds in combination are markedly less in degree of fading due to exposure to light.

Figure 3:
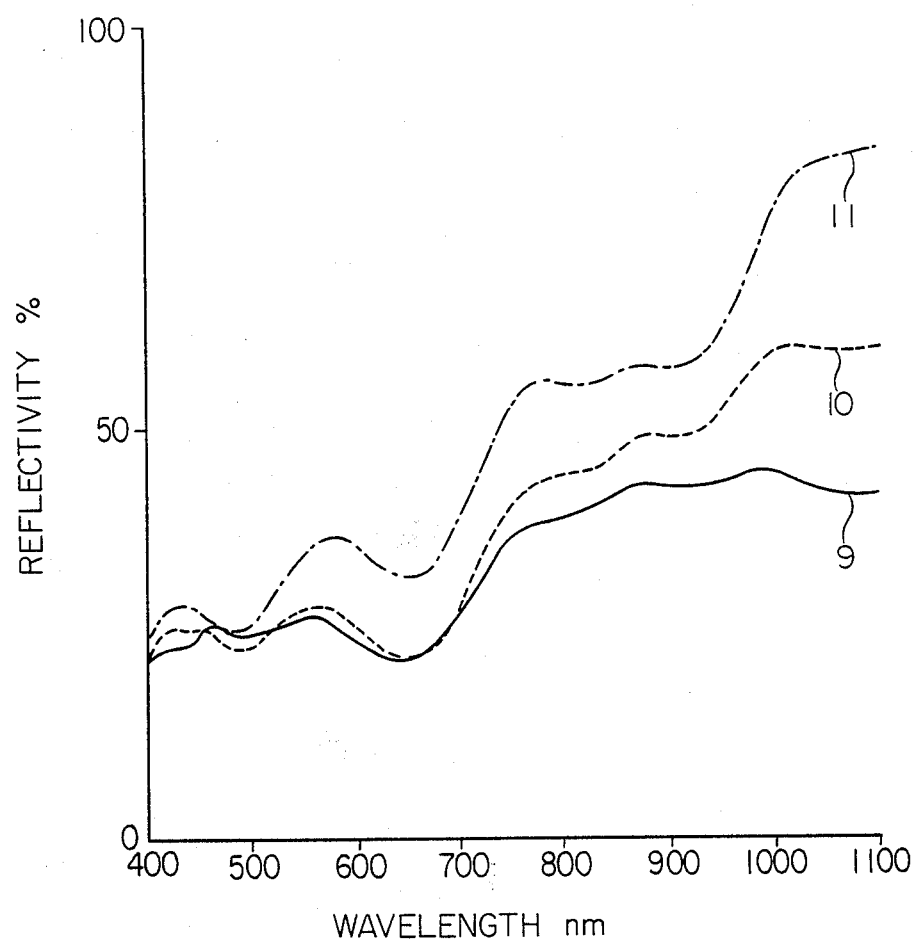
FIG. 3 shows reflection curves of colors (after light-fastness test) formed on three kinds of heat-sensitive recording papers prepared in Example 8 by using mixtures of 3-[4'-(4''-phenylaminophenylamino)-phenylamino]-6-methyl-7-chlorofluoran and 3,6-bis(-dimethylamino)fluorene-9-spiro-3'(6'-dimethylamino)phthalide, wherein curve 9 was obtained with heat-sensitive recording paper (2), curve 10 with heat-sensitive recording paper (3), and curve 11 with heat-sensitive recording paper (4).

FIG. 3 shows such interesting case. This case is illustrated in Example 8 wherein heat-sensitive recording papers are prepared by using the present fluoran compound and 3,6-bis(dimethylamino)fluorene-9-spiro-3'-(6'-dimethylamino)phthalide in varying proportions, and the dyes developed in these heat-sensitive recording papers were measured in reflection curve after light-fastness test to obtain the results as shown in FIG. 3.

Figure 8:
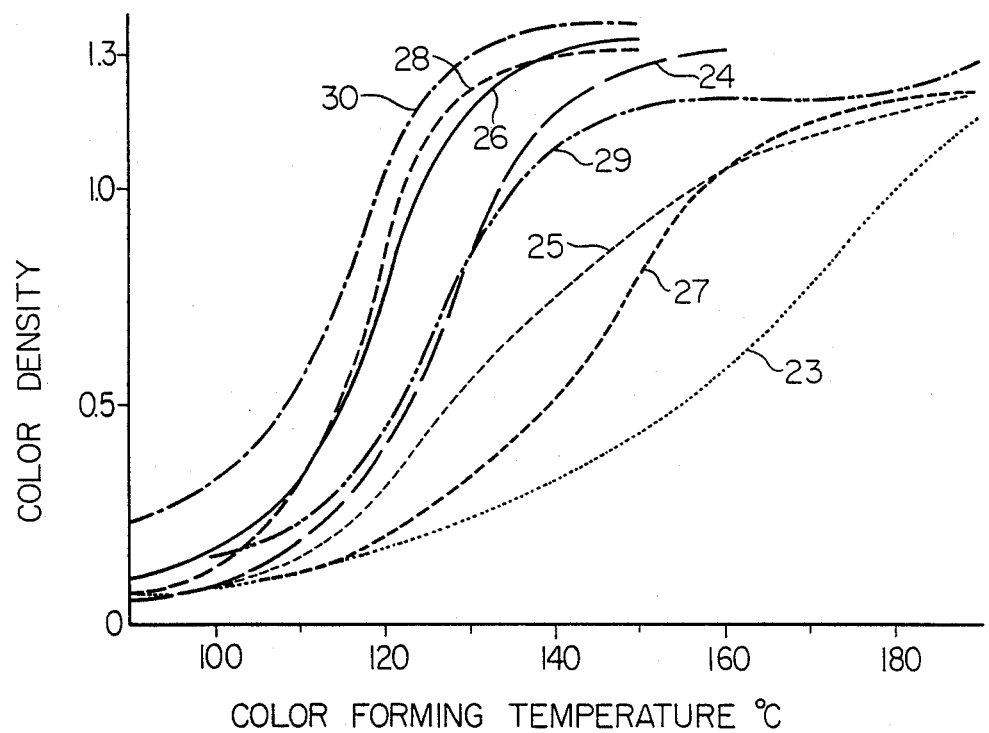
FIG. 8 is a graph showing a difference between heat-sensitive recording papers containing a sensitizer and those containing no sensitizer by way of the relationship between color forming temperature and color density of the color formed thereby, curves 23, 25, 27 and 29, respectively correspond to heat-sensitive recording papers (34), (36), (38) and (40) which contain no sensitizer, and curves, 24, 26, 28 and 30 respectively correspond to heat-sensitive recording papers (35), (37), (39) and (40) which contain the sensitizer.

In preparing color forming recording materials, the fluoran compounds of formula (I) are used in combination with the fluorene type compounds in the proportion of 9:1 to 1:9 to obtain the chromogenic recording materials less in degree of fading as aforesaid. Further, other chromogenic dyes can be of course used in combination with the abovementioned two compounds in order to control hue of the developed colors of the color forming recording materials thus prepared.

Where heat-sensitive recording papers are prepared by using the fluoran compounds of formula (I) and acidic substances, a sensitizer serves to enhance heat sensitivity of the papers. Even when the developer such as zinc 4-nitrobenzoate is used, however, the sensitizer functions very effectively. This case is shown in FIG. 8 and illustrated in Example 16 wherein benzyl terephthalate as a sensitizer was used in the combinations of four kinds of the fluoran compounds of formula (I), 3-[4'-(4''-phenylaminophenylamino)phenylamino]-6-methyl-7-chlorofluoran, 3-(4'-di-n-butylaminophenylamino)-6-methyl-7-chlorofluoran, 3-(4'-di-n-butylamino- phenylamino)-7-methylfluoran and 3-(4'-pyrrolidinophenyl- amino)-7-methylfluoran, and zinc 4-nitrobenzoate as a developer to investigate by comparison the effect of the presence of the sensitizer in each combination. In FIG. 8, it is found that addition of the sensitizer can achieve lower color forming temperature at the same color density or higher color density at the same color forming temperature.

The following examples shall further illustrate the invention.

Example 1

To 10.0 g of concentrated sulfuric acid cooled to about 10° C. with iced-water was added 1.0 g of 2-(5'-chloro-2'-hydroxy-4'-methyl)benzoylbenzoic acid and 1.0 g of 3-methoxy-4'-(4''-phenylaminophenylamino)diphenylamine. The mixture was stirred for 24 hours at room temperatures (about 25° C.), poured into 100 ml of iced-water, and the deposited reaction product was collected by filtration. The collected reaction product was washed with water and heated with stirring together with 150 ml of water, 2.0 g of caustic soda and 150 ml of toluene under reflux for 1 hour. The liquid was allowed to stand and the water layer was separated while being still hot, and the toluene layer was washed sufficiently with hot water. After distilling off the toluene, the residue was purified with a silica gel column to obtain 0.7 g of 3-[4'-(4''-phenylaminophenylamino)phenylamino]-6-methyl-7-chlorofluoran as grayish white crystals, m.p. 202.5°–203.5° C.

In this connection, the starting material, 3-methoxy-4'-(4''-phenylaminophenylamino)diphenylamine was prepared by the following procedure.

Reaction between 21.5 g of 3-methoxy-4'-hydroxydiphenylamine and 18.4 g of 4-aminodiphenylamine was effected at a temperature of 50° C. for 24 hours in 181.7 g of toluene as a solvent in the presence of 28.4 g of tetraisopropoxy titanium. After the completion of the reaction, toluene and water were added to the reaction solution and heated to decompose tetraisopropoxy titanium, and isopropyl alcohol formed on the decomposition and water were removed together with a part of toluene by distillation. The residual toluene solution was filtered under heat and concentrated to obtain 23.8 g of 3-methoxy-4'-(4''-phenylaminophenylamino)diphenylamine as pale yellow crystals, m.p. 152.8°–153.5° C.

Example 2

The same reaction and after-treatment as in Example 1 were repeated except that in place of 2-(5'-chloro-2'-hydroxy-4'-methyl)benzoylbenzoic acid there were used about 1 g each of 2-(2'-hydroxy-5'-methyl)benzoylbenzoic acid, 2-(2,-hydroxy-4',5'-dimethyl)benzoylbenzoic acid and 2-(2'-hydroxy-3',5'-dimethyl)benzoylbenzoic acid, respectively. There was obtained about 0.8 g each of 3-[4'-(4''-phenylaminophenylamino)phenylamino]-7-methylfluoran as grayish white crystals m.p. 133°–136° C., 3-[4'-(4''-phenylaminophenylamino)phenylamino]-6,7-dimethylfluoran as grayish purple crystals, m.p. 202.5°–207.7° C., and 3-[4'-(4''-phenylaminophenylamino)phenylamino]-5,7-dimethylfluoran as grayish white crystals, m.p. 247.8-248.5° C.

The thus obtained 3-[4'-(4''-phenylaminophenylamino)phenylamino]-7-methylfluoran and 3-[4'-(4''-phenylaminophenylamino)phenylamino]-5,7-dimethylfluoran, each 10 mg, were individually dissolved in 3 ml of acetone, and the solutions were individually dropped in several droplets onto a clay-coated bottom sheet and a resin-coated bottom sheet for pressure-sensitive copying paper. Evaporating off acetone gives rise to the colors of reddish black and blue black, respectively. The colors thus developed both had adsorption of electromagnetic waves in the near infrared region.

Example 3

Reaction between 14.1 g of 2-(2'-hydroxy-5'-methyl)-benzoylbenzoic acid and 16.7 g of 3-methoxy-4'-(4''-dimethylaminophenylamino)diphenylamine was carried out in the same manner as in Example 1, and the after-treatment was conducted in the following manner. The toluene solution after sufficient washing with hot water was concentrated and cooled to precipitate crystals, and the precipitated crystals were filtered off as crude crystals. Recrystallization from toluene gave 17.9 g of 3-[4'-(4''-dimethylaminophenylamino)-phenylamino]-7-methylfluoran as grayish white crystals, m.p. 199°–202° C.

Following the same procedure as above but using 2-(2'-carboxybenzoyl)-1-hydroxynaphthalene and 2-(2'-hydroxy-3',5'-dimethyl)benzoylbenzoic acid, respectively, in place of the 2-(2'-hydroxy-5'-methyl)benzoylbenzoic acid, there were prepared 3-[4'-(4''-dimethylaminophenylamino)phenylamino]-5,6-benzofluoran and 3-[4'-(4''-dimethylaminophenylamino)-phenylamino]-5,7-dimethylfluoran. Of the two compounds prepared above, the former was obtained as a non-crystalline precipitate, and the latter was obtained as greenish yellow crystals, m.p. 215.6°–217° C.

These two compounds were individually dissolved in toluene, and the solutions were coated respectively on a clay-coated bottom sheet and then dried, whereby both compounds developed in purplish black, and the colors both had adsorption of electromagnetic waves in the near-infrared region.

In this connection, the starting material, 3-methoxy-4'-(4''-dimethylaminophenylamino)diphenylamine was bluish green crystals, m.p. 118°–121° C., which had been prepared by the same reaction as in Example 1 using N,N-dimethyl-p-phenylenediamine and 3-methoxy-4'-hydroxy-diphenylamine.

Example 4

Following the same reaction and after-treatment as in Example 3 of 15.9 g of 2-(5'-chloro-2'-hydroxy-4'-methyl)benzoylbenzoic acid and 15.9 g of 3-methoxy-4'-(4''pyrrolidinophenylamino)diphenylamine, there was obtained 12.0 g of 3-[4'-(4''-pyrrolidinophenylamino)-phenylamino]-6-methyl-7-chlorofluoran as grayish white crystals, m.p. 164°–167° C.

In this connection, the starting material, 3-methoxy-4'-(4''-pyrrolidinophenylamino)diphenylamine was blue black crystals, m.p. 122°–124° C., which was prepared by the same reaction as in Example 1 using 4-pyrrolidinoaniline and 3-methoxy-4'-hydroxydiphenylamine.

Example 5

Reaction of 29.1 g of 2-(5'-chloro-2'-hydroxy-4-methyl)benzoylbenzoic acid with 22.8 g of 3-hydroxy-4'-dimethylaminodiphenylamine in 210 g of concentrated sulfuric acid and after-treatment (recrystallization omitted) of the reaction product were effected in the same manner as in Example 3 to obtain 34.5 g of 3-[4'-dimethylaminophenylamino]-6-methyl-7-chlorofluoran as substantially white crystals, m.p. 121.5°–125.0° C.

In this connection, the starting material, 3-hydroxy-4'-dimethylaminodiphenylamine was prepared in the following manner.

A mixture of 44.5 g (0.405 mol) of resorcin, 50.8 g (0.368 mol) of N,N-dimethyl-p-phenylenediamine and 3.7 g of 80% phosphoric acid was allowed to undergo reaction with stirring for 5 hours at a temperature of from 180° to 200° C. Thereafter, the reaction product was poured into a solution of 20 g of caustic soda in 200 ml of water, followed by adjusting pH to 7 with 50% sulfuric acid. The end product precipitated as a viscous oily product. After removal of the water layer, the oily product was distilled under a reduced pressure of 3 mmHg, and fraction obtained in the temperature range of from 180° to 225° C. was collected to obtain 43.1 g of a viscous pale yellow liquid. Recrystallization of the liquid from water gave gray crystals, m.p. 97.5°–98.5° C. In this distillation, the main fraction was obtained at 220° C./3 mmHg.

Following substantially the same procuedure as described above, the undermentioned compounds were prepared from corresponding benzoyl derivatives and diphenylamine derivatives.

| | |
|---|---|
| 3-(4'-Dimethylaminophenylamino)-7-methylfluoran | m.p. 99–102° C., 189–192° C.* Grayish white crystal |
| 3-(4'-di-n-Butylaminophenylamino)-6-methyl-7-chlorofluoran | m.p. 103.7–106.8° C. Grayish white crystal |
| 3-(4'-di-n-Butylaminophenylamino)-7-methylfluoran | m.p. 181.5–185° C. Grayish white crystal |
| 3-(4'-Pyrrolidinophenylamino)-7-methylfluoran | m.p. 125–126.2° C. Grayish white crystal |
| 3-(4'-Pyrrolidinophenylamino)-6-methyl-7-chlorofluoran | m.p. 158.4–160° C. Grayish white crystal |
| 3-(4'-Piperidinophenylamino)-7-methylfluoran | m.p. 119.8–123° C. White crystal |
| 3-(4'-Piperidinophenylamino)-5-methyl-7-chlorofluoran | m.p. 139.8–143.5° C. Yellow crystal |
| 3-(4'-Diethylaminophenylamino)-7-methylfluoran | m.p. 106–108° C. Grayish white crystal |
| 3-(4'-Diethylaminophenylamino)-6-methyl-7-chlorofluoran | m.p. 188.9–189.5° C. Grayish brown crystal |

*Two melting points were observed because of formation of an addition product of this compound with toluene.

Example 6

In 3 ml of acetone were dissolved 10 mg of 3-[4'-(4''-phenylaminophenylamino)phenylamino]-6-methyl-7-chlorofluoran of Example 1 and 20 mg of the acidic substances indicated in the following Table 1, and a white paper was spotted on the surface with several droplets of the solution. The acetone was evaporated to prepare a colored paper. Separately, a solution of 10 mg of the above-mentioned fluoran compound in 3 ml of acetone was applied onto each of the clay-coated bottom sheet and the resin-coated bottom sheet for pressure-sensitive copying paper to develop colors thereon.

Reflection curves of these developed colors were measured at a wavelength of 400 to 1100 nm with a spectrophotometer (U-3400 Model manufactured and sold by Hitachi Co. Ltd., accompanied by an integrating sphere) to obtain the results as shown in FIG. 1.

TABLE 1

| Curve No. In FIG. 1 | Acidic substance |
|---|---|
| 1 | Salt of zinc thiolbenzoate |
| 2 | 2-Bromobenzoic acid |
| 3 | Pentamethylene-bis-p-hydroxybenzoate |
| 4 | Tribromomethylphenyl sulfone |
| 5 | Clay-coated bottom sheet (a product of Fuji Photo Film Co., Ltd.) |
| 6 | Resin-coated bottom sheet (a product of Jujo Paper Mfg. Co., Ltd.) |

HEAT-SENSITIVE RECORDING PAPER

Examples 7-16

The dispersions used in Examples 7-16 were those which had been prepared in the manner as hereinafter described.

A. Dye dispersion

| | | Composition | |
|---|---|---|---|
| | | I | II |
| Proportions of | Fluoran compound | 7.0 | 1.0 |
| ingredients | Clay | 11.5 | 4.3 |
| (parts by weight) | 15% PVA aq. soln. | 41.5 | 11.9 |
| | Water | 40.0 | 11.4 |

| Dye dispersion | Color former | Composition |
|---|---|---|
| A-1 | 3-[4'-(4"-Phenylaminophenyl-amino)phenylamino]-6-methyl-7-chlorofluoran | II |
| A-2 | 3-[4'-(4"-Phenylaminophenyl-amino)phenylamino]-7-methylfluoran | II |
| A-3 | 3-[4'-(4"-Phenylaminophenyl-amino)phenylamino]-6,7-dimethylfluoran | II |
| A-4 | 3-[4'-(4"-Dimethylaminophenyl-amino)phenylamino]-7-methylfluoran | I |
| A-5 | 3-[4'-(4"-Pyrrolidinophenylamino)phenylamino]-6-methyl-7-chlorofluoran | I |
| A-6 | 3-(4'-Dimethylaminophenylamino)-6-methyl-7-chlorofluoran | I |
| A-7 | 3-(4'-Dimethylaminophenylamino)-7-methylfluoran | I |
| A-8 | 3-(4'-di-n-Butylaminophenylamino)-6-methyl-7-chlorofluoran | I |
| A-9 | 3-(4'-di-n-Butylaminophenylamino)-7-methylfluoran | I |
| A-10 | 3-(4'-Pyrrolidinophenylamino)-7-methylfluoran | I |
| A-11 | 3,6-bis(Dimethylamino)fluorene-9-spiro-3'-(6'-dimethylamino)-phthalide | I |

B. Developer dispersion

| | | Composition | | | |
|---|---|---|---|---|---|
| | | I | II | III | IV |
| Proportions of | Developer | 10.5 | 7.0 | 3.5 | 10.5 |
| ingredients | Clay | 8.0 | 11.5 | 15.0 | 8.0 |
| (parts by weight) | 15% PVA aq. soln. | 41.5 | 41.5 | 41.5 | 41.5 |
| | Water | 40.0 | 40.0 | 40.0 | 40.0 |

| Developer dispersion | Developer | Composition |
|---|---|---|
| B-1 | Bisphenol A | I |
| B-2 | 4-Hydroxy-4'-isopropoxydiphenyl sulfone | I |
| B-3 | Zinc 4-nitrobenzoate | II |
| B-4 | Zinc 4-nitrobenzoate | III |
| B-5 | Zinc 4-nitrobenzoate | I |
| B-6 | Zinc 2-methyl-5-nitrobenzenesulfonate | IV |
| B-7 | Zinc salicylate | IV |
| B-8 | Tribromomethylphenyl sulfone | III |

C. Sensitizer dispersion

| | | |
|---|---|---|
| Proportions of | Dibenzyl terephthalate | 7.0 |
| ingredients | Clay | 11.5 |
| (parts by weight) | 15% PVA aq. soln. | 41.5 |
| | Water | 40.0 |

D. Clay dispersion

| | | |
|---|---|---|
| Proportions of | Clay | 18.5 |
| ingredients | 15% PVA aq. soln. | 41.5 |
| (parts by weight) | Water | 40.0 |

Dye dispersions A, developer dispersions B, sensitizer dispersion C, and clay dispersion D were individually prepared in the following manner. In each case of these dispersions, the ingredients as prescribed above were charged, together with 150 parts by weight of glass beads (1-1.5 mm in diameter), into a polyethylene bottle, the bottle was sealed, and the contents of the bottle were milled for several hours with a paint conditioner manufactured by Red Devil Co., Ltd. to prepare each of dye dispersions A-1 to A-11, developer dispersions B-1 to B-8, and sensitizer dispersion C and clay dispersion D, respectively.

Heat-sensitive recording papers were prepared by mixing in appropriate proportions the dye dispersion with the developer dispersion and optionally with the sensitizer dispersion or clay dispersion to prepare a coating solution, applying the coating solution with Wirerod No. 12 or No. 18 onto the surface of a white paper, and drying the coated white paper for 2 minutes at 60° C. with hot air.

Example 7

A heat-sensitive recording paper (1) was prepared by using 5.0 g of dye dispersion A-1 and 5.0 g of developer dispersion B-2 (Wirerod No. 12 was used.). This heat-sensitive recording paper was heated on both sides for 5 seconds at a temperature of 180° C. with a dry heat tester (manufactured by Kishino Kagakukikai K.K.) to develop color. The color developed thereby was reddish black.

A part of this color developed heat-sensitive recording paper was subjected for 5 hours to light-fastness test with a light-fastness tester (FAL-5 Model manufactured by Suga Shikenki K.K.). The color after the test became deeper than that before the test.

The color developed portion of the heat-sensitive recording paper, before and after the light-fastness test, was measured for reflection curve at a wavelength of 400-1100 nm with a spectrophotometer (same as above). The reflection curves as measured are shown in FIG. 2.

Example 8

Dye dispersions A-1 and A-11 were mixed individually with developer dispersion B-2 in the following weight proportions to prepare four kinds of coating solutions as shown below. With these coating solutions, heat-sensitive recording papers (2), (3), (4) and (5) were prepared, respectively (Wirerod No. 12 was used.).

| Heat-sensitive recording paper | A-1 | A-11 | B-2 | Tone of color developed |
|---|---|---|---|---|
| (2) | 35 | 15 | 50 | Blue black |
| (3) | 25 | 25 | 50 | Color tone between (2) and (4) |
| (4) | 15 | 35 | 50 | Blackish blue |
| (5) | 0 | 50 | 50 | Blue |

These heat-sensitive recording papers were heated to develop colors in the same manner as in Example 7. Tones of the colors developed on these heat-sensitive recording papers were as shown above.

These heat-sensitive recording papers (2), (3) and (4) as color developed were subjected to light-fastness test in the same manner as in Example 7. As a result, it was observed that a bluish hue of each developed color disappeared, whereby the colors were black to grayish black color.

The color developed portions of these heat-sensitive recording papers were measured for reflection curve at a wavelength of 400–1100 nm in the same manner as in Example 7. The results are shown in FIG. 3.

Heat-sensitive recording paper (5) as color developed was also subjected to light-fastness test in the same manner as above, whereby its bluish hue changed to pale greenish brown color, and its absorption of electromagnetic waves in the near-infrared region substantially disappeared.

Example 9

Dye dispersions A-2 and A-3 were individually mixed with each of developer dispersions B-1 and B-2 in equal weight proportions to prepare their respective mixtures. Using the mixtures as prepared, there were prepared heat-sensitive recording papers (6) (A-2+B-1), (7) (A-2+B-2) (8) (A-3+B-1) and (9) (A-3+B-2) (Wirerod No. 18 was used.).

These heat-sensitive recording papers thus prepared were subjected to color development by heat in the same manner as in Example 7, whereby the developed colors were all black. The color developed portions of these heat-sensitive recording papers were measured for reflectivity at wavelengths of 700, 800, 900 and 1000 nm, respectively, in the same manner as in Example 7. The results are shown in Table 2.

Example 7 but using a temperature of 200° C. The colors developed on these heat-sensitive recording papers were all black.

Following the same procedures as in Example 7, the color developed portions of these heat-sensitive papers were measured for reflection curve (a range of wavelength 400–1300 nm) and for reflectivity (wavelengths 700, 800, 900 and 1000 nm), and the color undeveloped portions for reflectivity (same as above).

Furthermore, the color developed portions of these heat-sensitive recording papers were subjected to light-fastness test for 1 hour with the same apparatus as used in Example 7, and the resulting colors were measured for reflectivity in the same manner as above.

The reflection curves as measured are shown in FIG. 4. The reflectivities as measured in the color undeveloped portions, the color developed portions before the light-fastness test and the color developed portions after the light-fastness test, respectively, are shown in Table 3.

TABLE 3

|  | Reflectivity (%) | | | |
| --- | --- | --- | --- | --- |
|  | 700 nm | 800 nm | 900 nm | 1000 nm |
| Heat-sensitive recording paper (10) | | | | |
| Undeveloped portion | 95.5 | 98.1 | 99.0 | 99.0 |
| Developed portion before | 8.9 | 19.7 | 47.7 | 74.2 |

TABLE 2

|  | Light-fastness test | Portion | Reflectivity (%) | | | |
| --- | --- | --- | --- | --- | --- | --- |
|  |  |  | 700 nm | 800 nm | 900 nm | 1000 nm |
| Heat-sensitive recording paper (6) | Before | Undeveloped portion | 69.0 | 81.4 | 96.4 | 100 |
|  |  | Developed portion | 8.9 | 19.7 | 50.0 | 80.4 |
|  | After | Undeveloped portion | 73.9 | 84.5 | 95.9 | 98.8 |
|  |  | Developed portion | 8.9 | 18.7 | 42.0 | 52.0 |
| Heat-sensitive recording paper (7) | Before | Undeveloped portion | 74.5 | 85.1 | 97.9 | 100 |
|  |  | Developed portion | 7.8 | 19.0 | 51.5 | 79.0 |
|  | After | Undeveloped portion | 76.2 | 86.5 | 96.6 | 99.1 |
|  |  | Developed portion | 8.3 | 16.1 | 26.9 | 21.8 |
| Heat-sensitive recording paper (8) | Before | Undeveloped portion | 92.3 | 97.9 | 100 | 100 |
|  |  | Developed portion | 7.5 | 19.6 | 49.4 | 77.8 |
|  | After | Undeveloped portion |  |  |  |  |
|  |  | Developed portion | 7.9 | 20.0 | 44.3 | 55.2 |
| Heat-sensitive recording paper (9) | Before | Undeveloped portion | 94.8 | 98.4 | 99.4 | 99.3 |
|  |  | Developed portion | 6.6 | 21.5 | 52.9 | 75.4 |
|  | After portion | Undeveloped portion | 94.0 | 97.4 | 98.8 | 98.5 |
|  |  | Developed | 7.8 | 21.6 | 41.5 | 39.8 |

Example 10

Dye dispersion A-4 was mixed with developer dispersions B-1, B-2, B-3 and B-8, respectively, in the weight proportion of 1:2 to prepare coating solutions. With these coating solutions, there were prepared heat-sensitive recording papers (10), (11), (12) and (13) (Wirerod No. 18 was used.).

These heat-sensitive recording papers were subjected to color development by heat in the same manner as in

| | | | | |
| --- | --- | --- | --- | --- |
| light-fastness test | | | | |
| Developed portion after light-fastness test | 10.2 | 21.7 | 41.8 | 48.9 |
| Heat-sensitive recording paper (11) | | | | |
| Undeveloped portion | 97.1 | 99.2 | 99.4 | 99.3 |
| Developed portion before light-fastness test | 9.6 | 21.7 | 46.6 | 67.4 |
| Developed portion after light-fastness test | 9.8 | 17.1 | 24.3 | 22.9 |
| Heat-sensitive recording paper (12) | | | | |
| Undeveloped portion | 91.5 | 95.2 | 96.5 | 96.0 |

TABLE 3-continued

|  | Reflectivity (%) | | | |
| --- | --- | --- | --- | --- |
|  | 700 nm | 800 nm | 900 nm | 1000 nm |
| Developed portion before light-fastness test | 6.6 | 10.6 | 25.5 | 53.0 |
| Developed portion after light-fastness test | 7.4 | 12.1 | 26.5 | 42.4 |
| Heat-sensitive recording paper (13) | | | | |
| Undeveloped portion | 97.8 | 99.0 | 99.0 | 99.1 |
| Developed portion before light-fastness test | 10.6 | 29.9 | 57.7 | 61.2 |
| Developed portion after light-fastness test | 7.5 | 21.2 | 48.0 | 54.4 |

Example 11

Following substantially the same procedure as in Example 10, heat-sensitive recording papers (14) and (15) were prepared by using dye dispersion A-4 and developer dispersions B-4 and B-5.

In the same manner as in Example 10, the color developed portions of these heat-sensitive recording papers were measured for reflection curve and reflectivity, and the color undeveloped portions thereof for reflectivity.

The reflection curves as measured are shown in FIG. 5, and the reflectivities as measured are shown in Table 4. For comparison, the measured values of heat-sensitive shown in Table 4. In heat-sensitive recording papers (14), (12) and (15), the weight ratio of the dye to the developer is 1:1, 1:2 and 1:3, respectively.

TABLE 4

|  | Reflectivity (%) | | | |
| --- | --- | --- | --- | --- |
|  | 700 nm | 800 nm | 900 nm | 1000 nm |
| Heat-sensitive recording paper (14) | | | | |
| Undeveloped portion | 92.2 | 95.6 | 96.8 | 96.3 |
| Developed portion | 11.1 | 19.8 | 40.9 | 69.1 |
| Heat-sensitive recording paper (12) | | | | |
| Undeveloped portion | 91.5 | 95.2 | 96.5 | 96.0 |
| Developed portion | 6.6 | 10.6 | 25.5 | 53.0 |
| Heat-sensitive recording paper (15) | | | | |
| Undeveloped portion | 90.9 | 94.3 | 95.6 | 95.0 |
| Developed portion | 6.7 | 10.4 | 25.1 | 50.5 |

Example 12

Following substantially the same procedure as in Example 10, heat-sensitive recording paper (16) was prepared by using dye dispersion A-5 and developer dispersion B-1.

In the same manner as in Example 10, this heat-sensitive recording paper was subjected to color development, and the developed color was black. Further, the color developed portion of the heat-sensitive recording paper was measured for reflectivity, whereby the measured values were 12.7%/700 nm, 26.2%/800 nm, 51.0%/900 nm and 65.6%/1000 nm, thus the developed color had its absorption of electromagnetic wave in the near-infrared region.

Example 13

Following substantially the same procedure as in Example 10, heat-sensitive recording papers (17), (18), (19), (20) and (21) were prepared by using dye dispersion A-6 and developer dispersions B-1, B-2, B-5, B-6 and B-7, respectively.

These heat-sensitive papers (17) to (21) were subjected to color development in the same manner as in Example 7, except that (17) and (18) were developed at a temperature of 150° C., and the rest at a temperature of 200° C.

The colors developed in the heat-sensitive recording papers were blue black in (17), deep dark blue in (18), black in (19), deep dark blue in (20) and black in (21).

The color developed portions of these heat-sensitive recording papers were measured for reflection curve (a wavelength of 400–1200nm) in the same manner as in Example 7. The results are shown in FIGS. 6 and 7.

Further, the color developed portions of these heat-sensitive recording papers were subjected to light-fastness test for 1 hour with the same appratus as used in Example 7. Reflectivities (wavelengths of 700 nm, 780 nm, 830 nm, 900 nm and 1000 nm) of the color developed portions, before and after the light-fastness test, were measured in the same manner as in Example 7. The results are shown in Table 5.

TABLE 5

|  | Light-fastness test | Reflectivity (%) | | | | |
| --- | --- | --- | --- | --- | --- | --- |
|  |  | 700 nm | 780 nm | 830 nm | 900 nm | 1000 nm |
| Heat-sensitive recording paper (17) | Before | 8.9 | 17.8 | 30.9 | 62.8 | 96.3 |
|  | After | 8.8 | 18.1 | 31.7 | 64.3 | 96.0 |
| Heat-sensitive recording paper (18) | Before | 10.2 | 20.6 | 35.3 | 68.5 | 97.6 |
|  | After | 12.8 | 27.3 | 45.0 | 76.7 | 97.5 |
| Heat-sensitive recording paper (19) | Before | 7.0 | 9.1 | 13.8 | 34.9 | 87.4 |
|  | After | 7.1 | 9.5 | 14.6 | 36.8 | 88.4 |
| Heat-sensitive recording paper (20) | Before | 8.1 | 12.5 | 20.2 | 44.2 | 87.9 |
|  | After | 7.7 | 12.0 | 19.8 | 43.9 | 87.9 |
| Heat-sensitive recording paper (21) | Before | 7.1 | 9.6 | 14.8 | 36.8 | 87.2 |
|  | After | 8.2 | 11.8 | 18.5 | 40.8 | 88.3 |

Example 14

Following substantially the same procedure as in Example 10, heat-sensitive recording papers (22), (23) and (24) were prepared by using dye dispersion A-7 and developer dispersions B-1, B-2 and B-5, respectively.

The heat-sensitive recording papers thus prepared were subjected to color development in the same manner as in Example 13, whereby the developed colors were all bluish black.

Parts of these color developed papers were exposed to sunlight for 10 hours, and thereafter the color undeveloped portions and color developed portions, before and after exposure to sunlight, were measured for reflectivity in the same manner as in Example 7. The results are shown in Table 6. In this connection, the hues of the color developed portions after exposure were found substantially the same as those observed before exposure.

TABLE 6

|  | Sunlight exposure test | Portion measured | Reflectivity (%) | | | | |
| --- | --- | --- | --- | --- | --- | --- | --- |
|  |  |  | 700 nm | 780 nm | 830 nm | 900 nm | 1000 nm |
| Heat-sensitive recording paper (22) | Before | Undeveloped portion | 87.2 | 95.9 | 97.7 | 100 | 100 |
|  |  | Developed | 6.5 | 13.7 | 18.0 | 65.7 | 98.6 |

TABLE 6-continued

| | Sunlight exposure test | Portion measured | Reflectivity (%) | | | | |
|---|---|---|---|---|---|---|---|
| | | | 700 nm | 780 nm | 830 nm | 900 nm | 1000 nm |
| | | portion | | | | | |
| | After | Undeveloped portion | 90.4 | 96.4 | 97.6 | 100 | 100 |
| | | Developed portion | 7.7 | 16.7 | 21.6 | 68.7 | 98.1 |
| Heat-sensitive recording paper (23) | Before | Undeveloped portion | 96.5 | 99.3 | 100 | 100 | 100 |
| | | Developed portion | 7.9 | 19.6 | 25.4 | 72.5 | 98.2 |
| | After | Undeveloped portion | 93.8 | 97.1 | 97.7 | 99.5 | 100 |
| | | Developed portion | 10.1 | 24.6 | 31.3 | 77.3 | 98.1 |
| Heat-sensitive recording paper (24) | Before | Undeveloped portion | 90.0 | 96.6 | 98.0 | 100 | 100 |
| | | Developed portion | 7.2 | 10.8 | 13.1 | 49.4 | 94.9 |
| | After | Undeveloped portion | 89.3 | 94.2 | 95.4 | 99.6 | 100 |
| | | Developed portion | 7.5 | 11.2 | 14.0 | 50.8 | 94.9 |

Example 15

Following substantially the same procedure as in Example 10, there were prepared heat-sensitive recording papers (25), (26) and (27) by using dye dispersion A-8 in combination with developer dispersions B-1, B-2 and B-5, respectively, heat-sensitive recording papers (28), (29) and (30) by using dye dispersion A-9 in combination with three developer dispersions as mentioned above, and heat-sensitive recording papers (31), (32) and (33) by using dye dispersion A-10 in combination with three developer dispersions mentioned above.

These heat-sensitive recording papers prepared above were subjected to color development by heat in the same manner as in Example 13, whereby the developed colors were dark green to greenish black.

Further, the color developed portions of these heat-sensitive recording papers were measured, before and after light-fastness test, for reflectivity in the same manner as in Example 13. The results are shown in Table 7.

TABLE 7

| | Light-fastness test | Reflectivity (%) | | | | |
|---|---|---|---|---|---|---|
| | | 700 nm | 780 nm | 830 nm | 900 nm | 1000 nm |
| Heat-sensitive recording paper (25) | Before | 6.8 | 10.0 | 11.8 | 38.6 | 88.2 |
| | After | 6.7 | 9.9 | 11.7 | 38.3 | 87.3 |
| Heat-sensitive recording paper (26) | Before | 9.0 | 14.7 | 17.7 | 50.5 | 92.3 |
| | After | 9.1 | 15.7 | 19.1 | 53.4 | 92.7 |
| Heat-sensitive recording paper (27) | Before | 6.8 | 7.9 | 8.5 | 21.4 | 72.2 |
| | After | 7.2 | 8.6 | 9.5 | 24.1 | 75.2 |
| Heat-sensitive recording paper (28) | Before | 6.6 | 10.8 | 13.5 | 51.2 | 94.5 |
| | After | 6.5 | 10.9 | 13.7 | 50.8 | 92.5 |
| Heat-sensitive recording paper (29) | Before | 7.6 | 14.8 | 18.8 | 59.7 | 95.2 |
| | After | 9.1 | 17.9 | 22.4 | 63.7 | 94.2 |
| Heat-sensitive recording paper (30) | Before | 7.1 | 9.1 | 10.4 | 35.4 | 87.0 |
| | After | 7.8 | 10.8 | 12.6 | 39.6 | 88.2 |
| Heat-sensitive recording paper (31) | Before | 6.0 | 9.4 | 11.6 | 44.5 | 91.6 |
| | After | 6.1 | 9.7 | 11.9 | 44.0 | 90.7 |
| Heat-sensitive recording paper (32) | Before | 5.8 | 10.0 | 12.6 | 47.9 | 92.8 |
| | After | 6.6 | 11.5 | 14.5 | 50.2 | 91.8 |
| Heat-sensitive recording paper (33) | Before | 6.4 | 8.0 | 9.1 | 30.6 | 84.5 |
| | After | 6.5 | 8.4 | 9.6 | 32.8 | 84.7 |

Example 16

Dye dispersions A-1, A-8, A-9 and A-10 were individually mixed with developer dispersion B-5, sensitizer dispersion C and clay dispersion D in the following weight proportion to prepare coating solutions, respectively. Heat-sensitive recording papers (34) to (41) were prepared by using the coating solutions, respectively, as prepared above.

| Heat-sensitive recording paper No. | Dispersion | | | | | | |
|---|---|---|---|---|---|---|---|
| | A-1 | A-8 | A-9 | A-10 | B-5 | C | D |
| (34) | 1 | — | — | — | 2 | — | 1 |
| (35) | 1 | — | — | — | 2 | 1 | — |
| (36) | — | 1 | — | — | 2 | — | 1 |
| (37) | — | 1 | — | — | 2 | 1 | — |
| (38) | — | — | 1 | — | 2 | — | 1 |
| (39) | — | — | 1 | — | 2 | 1 | — |
| (40) | — | — | — | 1 | 2 | — | 1 |
| (41) | — | — | — | 1 | 2 | 1 | — |

The above-mentioned heat-sensitive recording papers (35), (37), (39) and (41) contain a sensitizer, heat-sensitive recording papers (34) (36), (38) and (40) contain clay in place of the sensitizer, and total concentrations of solids in the coating solutions have the same level.

These heat-sensitive recording papers were subjected to color development at varying temperatures with a heat gradient tester (manufactured by Toyo Seiki Seisakusho Co., Ltd.), and the color developed portions thereof were measured for color density with a Macbeth densitometer. The results are shown in FIG. 8.

PRESSURE-SENSITIVE COPYING PAPER

Example 17

3-[4'-(4''-Phenylaminophenylamino)phenylamino]-6-methyl-7-chlorofluoran, 3-[4'-(4''-pyrrolidinophenylamino)phenylamino]-6-methyl-7-chlorofluoran and 3-(4'-dimethylaminophenylamino)-6-methyl-7-chlorofluoran, each 2.0 g, were inividually mixed with 25.0 g of alkyldiphenylmethane (Highsol SAS 296, a product of Nisseki Chemical Co., Ltd.) and 18.0 g of diisopropylnaphthalene (KMC-113, a product of Kureha Chemical Co., Ltd.), and the mixtures were individually heated to dissolve. The solutions were independently stirred for 10 minutes at 90° C. and then cooled to prepare solutions A-1, A-2 and A-3, respectively.

Separately, a solution comprising 15.0 g of a 10% aqueous solution of sulfonic acid-modified polyvinyl alcohol (Gosenol CKS-50, a product of The Nippon Synthetic Chemical Industry Co., Ltd., average polymerization degree about 300, saponification value 97%, and modification degree 10 mol %), 7.5 g of a 10% aqueous solution of an ethylene-maleic anhydride copolymer (EMA-31, a product of Monsanto Co.), and 0.25 g of resorcin was adjusted to pH 3.4 with a 20% aqueous caustic soda solution to prepare solution B. (This solution B was prepared three times).

Solutions A-1, A-2 and A-3 were individually added to solution B, and the mixtures were stirred for 2 minutes with a homomixer at 9,000 rpm to prepare their respective emulsions. The emulsions each charged with 7.0 g of a 35% aqueous formalin solution and the mixtures were stirred for 3 minutes at 9,000 rpm. Thereafter, the number of rotation was reduced to 8,000 rpm, and the stirring was continued for 60 minutes at a temperature elevated to 60°-65° C. The stirring with the homomixer was then discontinued, the solution was cooled to 40° C., and the solutions were then adjusted to pH 7.5 with a 28% ammonia water to obtain three kinds of suspensions of microcapsules.

A mixture comprising 27.0 g of each of the suspensions prepared above (kept at a temperature below 30° C.), 3.5 g of wheat starch, 8.5 g of a 8% aqueous wheat starch solution and 34.0 ml of water was stirred for 30 minutes at room temperature with a stirrer. In this manner, there were prepared coating solutions 1, 2 and 3, respectively.

These coating solutions were individually coated with Wirerod No. 12 on a white paper and then dried for 3 minutes with hot air kept at 60° C. to prepare top sheets (1), (2) and (3) for pressure-sensitive copying paper, respectively.

The coated surfaces of the above-mentioned top sheets (1) and (2) were individually superposed on the coated surface of a bottom sheet for pressure-sensitive copying paper prepared by coating a phenol-formalin resin on a paper, and of a clay-coated bottom sheet for pressure-sensitive copying paper (a product of Fuji Photo Film Co., Ltd.), and the thus prepared pressure-sensitive copying papers were individually pressed with a twin roll at a pressure of 20 kg/cm² to develop colors on the coated surface of the bottom sheets, respectively.

As a result, the color developed portions of these two bottom sheets reddish black color for top sheet (1) and purplish black color and a greenish black color for top sheet (2), said all colors adsorbing the electromagnetic waves in the near-infrared region.

The coated surface of top sheet (3) was supperposed on the coated surface of the phenol-formalin resin coated bottom sheet for pressure-sensitive copying paper, and letters were written on the upper surface of the top sheet, whereby clear letters in a dark green appeared on the coated surface of the bottom sheet.

What is claimed is:

1. A color forming recording material which comprises a substrate, a color former and a developer which are supported on the substrate, said color former being at least one fluoran compound of formula (I)

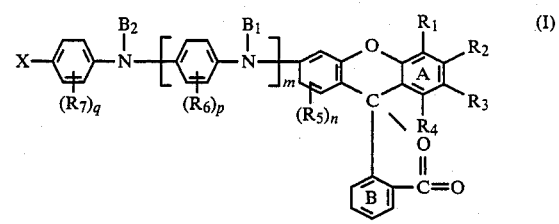

wherein $R_1$, $R_2$, $R_3$ and $R_4$ are the same or different and each is selected from the group consisting of hydrogen, halogen, lower alkoxy, alkyl of 1 to 9 carbons, cycloalkyl of 5 to 6 carbons, substituted and unsubstituted benzyl or phenyl, said substituted benzyl or phenyl having substituents selected from the group consisting of halogen, lower alkyl and lower alkoxy, and further, $R_1$ and $R_2$, as well as $R_3$ and $R_4$, when taken together with ring A, may form a naphthalene ring, said naphthalene ring being unsubstituted or substituted by a halogen, lower alkyl or lower alkoxy group; $R_5$, $R_6$ and $R_7$ are the same or different and each represents a halogen, lower alkyl or lower alkoxy group; $B_1$ and $B_2$ are the same or different and each represents hydrogen, alkyl of 1 to 8 carbons, benzyl or phenyl, said benzyl or phenyl being unsubstituted or substituted by a halogen, lower alkyl, lower alkoxy, or alkyl-substituted amino group; X represents hydrogen or $-NR_8R_9$ wherein $R_8$ and $R_9$ are the same or different and each represents hydrogen, alkyl or 1 to 8 carbons, cycloalkyl of 5 or 6 carbons, or benzyl, said benzyl being unsubstituted or substituted by a halogen, lower alkyl, lower alkoxy, or alkyl-substituted amino group; and further, $R_8$ and $R_9$, when taken together with the adjacent nitrogen atom to which they are attached may form a pyrrolidino, piperidino or morpholino ring; ring B being unsubstituted or substituted by halogen; n, p and q independently represent 0, 1 or 2; and m represents 0, 1, 2 or 3, provided that when m is 0 or 1, X is not hydrogen atom.

2. The recording material of claim 1, wherein the color former is a fluoran compound of the formula (I) wherein $R_1$, $R_2$, $R_3$ and $R_4$ are the same or different and each is hydrogen, halogen or $C_1$-$C_9$ alkyl; or $R_1$ and $R_2$, as well as $R_3$ and $R_4$ when taken together with ring A, form a naphthalene ring; and n is 0.

3. The recording material of claim 1 wherein the developer is an acidic substance.

4. The recording material of claim 1 wherein the developer is an organohalogen compound which forms a halogen radical by the action of heat.

5. The recording material of claim 4 wherein the organohalogen compound is represented by the formula

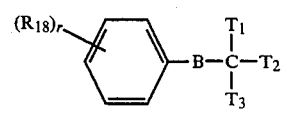

wherein $R_{18}$ represents halogen, nitro or lower alkyl, r represents 0 or an integer of 1 to 5, when r is 2 or more, $R_{18}$ may be different substitutents, B represents

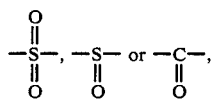

and $T_1$, $T_2$ and $T_3$ each represent hydrogen, chlorine or bromine, provided that all $T_1$, $T_2$ and $T_3$ are not hydrogen simultaneously.

6. The recording material of claim 1 wherein the developer is polyvalent metal salts of substituted or unsubstituted nitrobenzoic and nitrobenzenesulfonic acids.

7. The recording material of claim 1 which further comprises at least one other different chromogenic dye which forms color absorbing electromagnetic waves in the near-infrared region by the action of a developer.

8. The recording material of claim 7 wherein the chromogenic dye is a fluorene type compound of the formula

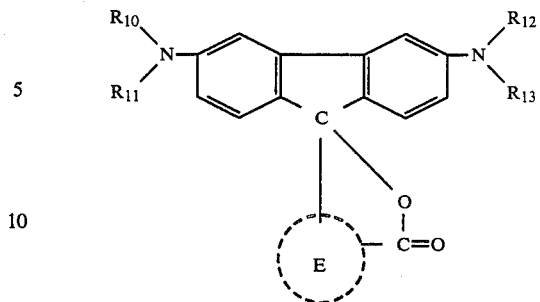

wherein ring E is

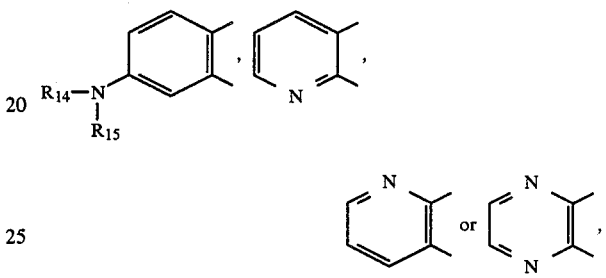

$R_{10}$, $R_{11}$, $R_{12}$, $R_{13}$, $R_{14}$ and $R_{15}$ independently are hydrogen, alkyl of 1 to 12 carbon atoms, cycloalkyl which may be substituted by one or more lower alkyl, phenyl or benzyl, $R_{10}$ and $R_{11}$, and $R_{12}$ and $R_{13}$ or/and $R_{14}$ and $R_{15}$ taken together with the nitrogen atom to which they are attached, may form a 5- or 6-membered heterocyclic ring.

9. The recording material of claim 1 which further comprises at least one chromogenic dye selected from black, blue, green and red color formers other than chromogenic dye which forms color absorbing electromagnetic waves in the near-infrared region by the action of the developer.

10. The recording material of claim 9 wherein the black color former is a fluoran compound other than the compound of claim 1.

* * * * *

UNITED STATES PATENT AND TRADEMARK OFFICE
CERTIFICATE OF CORRECTION

PATENT NO. : 4,826,806

DATED : May 2, 1989

INVENTOR(S) : Obitsu et al.

It is certified that error appears in the above-identified patent and that said Letters Patent is hereby corrected as shown below:

Title page, item [75] the following name should be added:

--Toshiyuki TANAKA
  Tokyo, Japan--.

Signed and Sealed this

Fifth Day of September, 1989

Attest:

DONALD J. QUIGG

*Attesting Officer*  *Commissioner of Patents and Trademarks*